US006769019B2

(12) United States Patent
Ferguson

(10) Patent No.: US 6,769,019 B2
(45) Date of Patent: *Jul. 27, 2004

(54) METHOD OF BACKGROUND DOWNLOADING OF INFORMATION FROM A COMPUTER NETWORK

(76) Inventor: Xavier Ferguson, 16 Willits Rd., Glen Cove, NY (US) 11542

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/988,347

(22) Filed: Dec. 10, 1997

(65) Prior Publication Data

US 2002/0178232 A1 Nov. 28, 2002

(51) Int. Cl.⁷ .......................... G06F 15/16; G06F 17/30
(52) U.S. Cl. ....................... 709/219; 345/748; 345/760; 705/14
(58) Field of Search ............................... 709/201, 203, 709/219, 223, 228, 229; 345/748, 760; 705/14

(56) References Cited

U.S. PATENT DOCUMENTS

| 5,491,820 A | * | 2/1996 | Belove et al. .................. 707/3 |
| 5,515,270 A | | 5/1996 | Weinblatt .................... 364/405 |
| 5,572,643 A | | 11/1996 | Judson ........................ 395/793 |
| 5,583,994 A | | 12/1996 | Rangan ................. 395/200.09 |
| 5,614,927 A | | 3/1997 | Gifford et al. .............. 395/612 |
| 5,625,781 A | | 4/1997 | Cline et al. .................. 395/335 |
| 5,715,445 A | | 2/1998 | Wolfe .......................... 395/605 |
| 5,717,923 A | | 2/1998 | Dedrick ....................... 395/613 |
| 5,727,129 A | | 3/1998 | Barrett et al. ................. 395/12 |
| 5,734,119 A | | 3/1998 | France et al. ................. 84/622 |
| 5,737,619 A | | 4/1998 | Judson ....................... 395/761 |
| 5,778,372 A | | 7/1998 | Cordell et al. ............... 707/100 |
| 5,784,058 A | | 7/1998 | LaStrange et al. .......... 345/340 |
| 5,796,952 A | | 8/1998 | Davis et al. ........... 395/200.54 |
| 5,802,292 A | | 9/1998 | Mogul ................... 395/200.33 |

(List continued on next page.)

FOREIGN PATENT DOCUMENTS

| EP | 0 875 843 A1 | 11/1998 | ........... G06F/17/30 |
| EP | 0 957 438 A2 | 11/1999 | ........... G06F/17/30 |
| WO | WO 98/25198 | 6/1998 | ............ G06F/3/00 |

OTHER PUBLICATIONS

Barish, et al., "World Wide Web Caching: Trends and Techniques", IEEE Communications Magazine, May 2000, pp. 178–185.

"Installation & Quick Start Guide: WEBEX for Windows 95/NT", pp. 4–35.

Brown, M. H. et al., "DeckScape: an experimental Web browser", Computer Networks and ISDN Systems 27, 1995, pp. 1097–1105.

Darcy Fowkes, "SpotOn Harnesses the Web: Customizing Internet Content for Personal Use or Distribution", Feb. 2000, pp. 1–5.

Primary Examiner—Dung C. Dinh
(74) Attorney, Agent, or Firm—Mannava & Kang; Ashok K Mannava

(57) ABSTRACT

Information is conventionally downloaded from a computer network to a computer operated, by a user, such as when the user is surfing the Internet. Downloading of information is enhanced by downloading addictional information selected by the user during idle times when the conventionally downloaded information is not being downloaded. The additional information may comprise web pages or other information previously selected by the user, which is downloaded in the background during the idle times. A graphic user interface is provide for accepting user selections of the addictional information, which may be displayed in a browser connected to the graphic user interface. The additional information is cached at the user's computer and can be displayed at time selected by the user.

59 Claims, 24 Drawing Sheets

U.S. PATENT DOCUMENTS

| | | | |
|---|---|---|---|
| 5,802,299 A | | 9/1998 | Logan et al. .......... 395/200.48 |
| 5,805,809 A | | 9/1998 | Singh et al. ........... 395/200.33 |
| 5,805,815 A | | 9/1998 | Hill ....................... 395/200.48 |
| 5,809,242 A | | 9/1998 | Shaw et al. ............ 395/200.47 |
| 5,819,043 A | * | 10/1998 | Baugher et al. ............. 709/222 |
| 5,826,031 A | | 10/1998 | Nielsen ................. 395/200.63 |
| 5,835,905 A | | 11/1998 | Pirolli et al. .................... 707/3 |
| 5,838,790 A | | 11/1998 | McAuliffe et al. ............. 380/4 |
| 5,848,396 A | | 12/1998 | Gerace ........................ 705/10 |
| 5,848,397 A | | 12/1998 | Marsh et al. .................. 705/14 |
| 5,848,424 A | | 12/1998 | Scheinkman et al. ....... 707/501 |
| 5,857,175 A | | 1/1999 | Day et al. ..................... 705/14 |
| 5,860,074 A | | 1/1999 | Rowe et al. ................. 707/526 |
| 5,862,339 A | | 1/1999 | Bonnaure et al. ...... 395/200.57 |
| 5,870,724 A | | 2/1999 | Lawlor et al. ................. 705/42 |
| 5,878,223 A | | 3/1999 | Becker et al. ......... 395/200.53 |
| 5,913,040 A | | 6/1999 | Rakavy et al. ......... 395/200.62 |
| 5,918,239 A | | 6/1999 | Allen et al. ................. 707/526 |
| 5,919,247 A | | 7/1999 | Van Hoff et al. ........... 709/217 |
| 5,933,811 A | | 8/1999 | Angles et al. ................ 705/14 |
| 5,948,061 A | | 9/1999 | Merriman et al. .......... 709/219 |
| 5,960,406 A | | 9/1999 | Rasansky et al. |
| 5,961,602 A | | 10/1999 | Thompson et al. |
| 5,978,807 A | | 11/1999 | Mano et al. .................. 707/10 |
| 5,978,841 A | | 11/1999 | Berger |
| 5,978,848 A | | 11/1999 | Maddalozzo, Jr. et al. . 709/227 |
| 5,991,735 A | | 11/1999 | Gerace ........................ 705/10 |
| 5,996,007 A | | 11/1999 | Klug et al. ................. 709/218 |
| 6,006,257 A | * | 12/1999 | Slezak ........................ 709/219 |
| 6,009,410 A | | 12/1999 | LeMole et al. ................ 705/14 |
| 6,009,452 A | * | 12/1999 | Horvitz ....................... 709/102 |
| 6,011,537 A | * | 1/2000 | Slotznick .................... 345/115 |
| 6,014,502 A | | 1/2000 | Moraes .................. 595/200.49 |
| 6,025,837 A | | 2/2000 | Matthews, III et al. ...... 345/327 |
| 6,026,368 A | | 2/2000 | Brown et al. .................. 705/14 |
| 6,029,175 A | * | 2/2000 | Chow et al. ................. 707/104 |
| 6,038,601 A | * | 3/2000 | Lambert et al. ............ 709/226 |
| 6,044,376 A | | 3/2000 | Kurtzman, II .............. 707/102 |
| 6,047,356 A | | 4/2000 | Anderson et al. ........... 711/129 |
| 6,049,835 A | | 4/2000 | Gagnon ...................... 709/245 |
| 6,055,510 A | | 4/2000 | Henrick et al. ............... 705/14 |
| 6,055,569 A | | 4/2000 | O'Brien et al. ............. 709/223 |
| 6,055,573 A | | 4/2000 | Gardenswartz et al. ..... 709/224 |
| 6,065,024 A | | 5/2000 | Renshaw .................... 707/513 |
| 6,067,565 A | | 5/2000 | Horvitz ....................... 709/218 |
| 6,073,168 A | | 6/2000 | Mighdoll et al. ........... 709/217 |
| 6,094,677 A | | 7/2000 | Capek et al. |
| 6,098,096 A | * | 8/2000 | Tsirigotis et al. ........... 709/213 |
| 6,105,028 A | * | 8/2000 | Sullivan et al. ............... 707/10 |
| 6,157,946 A | | 12/2000 | Itakura et al. .............. 709/217 |
| 6,182,122 B1 | * | 1/2001 | Berstis ........................ 709/217 |
| 6,185,586 B1 | * | 2/2001 | Judson ....................... 707/513 |
| 6,324,519 B1 | | 11/2001 | Eldering |
| 6,327,574 B1 | | 12/2001 | Kramer et al. |
| 6,334,110 B1 | | 12/2001 | Walter et al. |
| 6,385,619 B1 | | 5/2002 | Eichstaedt et al. |
| 6,487,538 B1 | | 11/2002 | Gupta et al. |

* cited by examiner

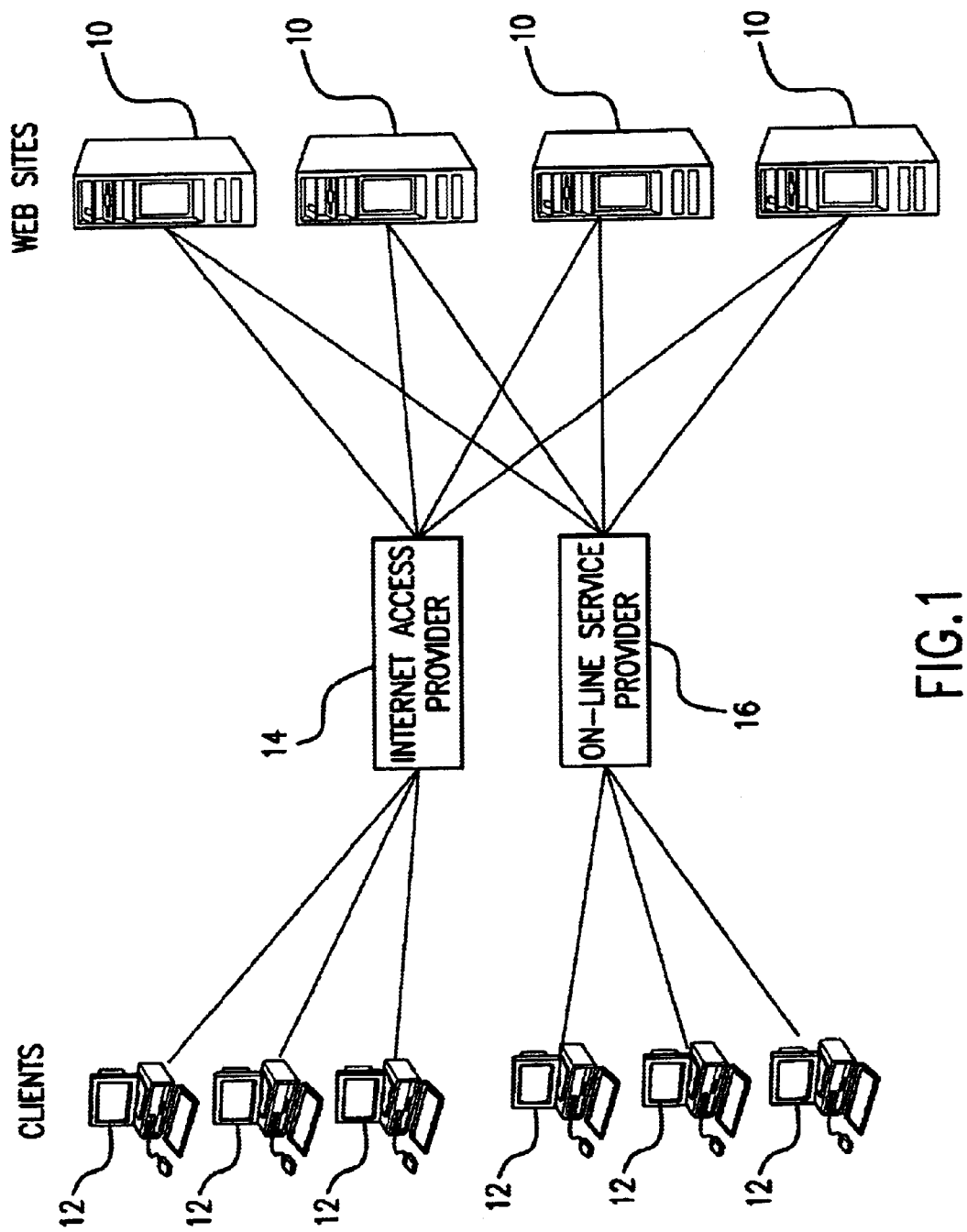

METHOD OF BACKGROUND DOWNLOADING OF INFORMATION FROM A COMPUTER NETWORK

FIELD OF THE INVENTION

This invention relates generally to the worldwide computer network known as the Internet, and more particularly to a method for maximizing the bandwidth on this network.

BACKGROUND OF THE INVENTION

The Internet has seen expansive growth over the past several years, most notably the user-friendly multimedia portion of this global computer network, known as the World Wide Web. This rapid growth has been driven by two general trends: (i) the general public is becoming more comfortable with computers and how computers, when linked together, can provide vast amounts of information with the point of a mouse or the stroke of a few keys on a home computer; and (ii) large companies are attracted to the World Wide Web as the latest marketing communications forum in which to reach millions of consumers from all over the world with brand new types of database-driven advertising. These two trends have created a perpetual spiral of Internet growth, as more consumers attract more companies, who provide more information and content, which attracts more consumers, and so on.

While the information is easily available on the Internet, it is not without its costs. To connect to the Internet, the use of cables or wiring is necessary. The information is transferred from one computer to another along these cables, which, for the vast majority of users, consist of ordinary copper pair telephone wire. Since copper pair wiring was originally constructed to carry analog voice traffic, the transmission of digital information, otherwise known as downloading or uploading, is subject to great delays in which the user is forced to wait for the information to be transferred to their computers for display. This delay can result in a significant waste of users' time, and even money if the transmission is subject to an Internet connect or telephone charges. One way to solve these problems is to allow a user to dynamically pre-select the information he/she will want to view in the near feature, and allow the transfer of that data in the background over the connection that remains idle while the user is viewing other data.

The World Wide Web section of the Internet is accessed with the use of known client software called a Web browser (the term "client" is commonly used to describe the user's computer). All Web browsers use a graphical interface to provide for ease of use. The browser allows the user to connect to computers all over the world via the World Wide Web, which is essentially a collection of so-called "server" computers that utilize the Hypertext Transfer Protocol (HTTP). HTTP is a well known protocol that provides users access to files or Web pages (consisting of text, graphics, images, video, sound, etc.) using a standard page description language known as Hypertext Markup Language (HTML). Using an HTML-compliant browser, users can access HTML Web pages, by linking to or specifying the address of a page via its computer address, known as a Uniform Resource Locator (URL). Upon such specification, the browser makes a request to the server identified in the link or address, and receives the requested Web page. There is a time delay between the time the user initiates the link, and the transmission and display of the Web page on the user's computer. Even with today's enhanced communication hardware this delay will exist, due to ever-increasing network usage/congestion, and the predominance of telephone connections for accessing the Internet. Once the page is downloaded and displayed, the user then reads the page. Usually, while a user is actually viewing a Web page, the connection between the client and the server remains idle. This idle period can be used to download the next set of Web pages the user will want to view.

The object of the present invention is to reduce or eliminate this time delay by having the user dynamically pre-select Web pages for downloading in the background while he/she is reading another web page. These pre-selected pages are stored in a cache on the hard drive of the user's computer. When the user is ready to view the next Web page, he/she simply clicks on its title which is presented in a list in the interface of the invention, and the page is instantly retrieved from the hard drive of the user's computer, thereby significantly reducing or eliminating the wait time (depending on the processing power of the user's computer to retrieve data from its own hard drive). Additionally, this will lessen the connection costs associated with using the Internet if any such charges are being incurred.

The other objective of this invention is to provide a brand new advertising medium for companies that wish to reach consumers on the Internet. Given that the interface of the invention floats above the browser, it presents itself as a unique and premium location for advertising. Advertisers are able to achieve maximum exposure for their message, since the interface containing their messages remains in the view of all users at all times (as it needs to be ever-present to receive dragged-&-dropped links for background downloading). A user who sees an advertisement in the interface that is of interest can click on the advertisement to go to the Web page of the product/company associated with the advertisement. The advertisements themselves also take advantage of idle connection time, and new advertisements are downloaded to the user's computer from across the Internet. The advertisements are stored in a head-end computer, containing a sophisticated database controlling which advertisements get delivered to which user's computers. Each advertisement is transmitted to the user's computer, is stored momentarily on the user's hard drive while awaiting a slot in the display schedule, and is then displayed for a fixed period of time in the interface (similar to a television commercial). It is then replaced with the next advertisement which was downloaded from the Internet. The invention monitors the advertising display system, and keeps track of the number of times an advertisement is displayed and the number of times the user responds to (i.e. clicks on) the advertisements. This information is periodically uploaded back to the head-end computer and is used to customize the targeting of subsequent ads according to a profile that is developed for each user. It is these profiles combined with the perpetual display of messages, and the background delivery of advertising, which is unique and extremely powerful for those companies who partake in advertising on the Internet.

SUMMARY OF THE INVENTION

The invention is an advertiser-supported interactive Web accelerator. It is a method for maximizing the use of available bandwidth while browsing the World Wide Web section of the Internet, by allowing users to dynamically pre-select content to be viewed next. The method reduces or eliminates the waiting associated with using the World Wide Web. The method utilizes an interface which displays itself in accompaniment with known Web browser software, onto which the user can dynamically select hyperlinks from a Web page displayed in the window of a browser by "dragging-&-dropping" them with a pointing device, such as a mouse. This procedure allows for the real-time background downloading of Web pages which the user designates as the next Web pages he/she wants to view, while he/she is viewing other content. These dragged-&-dropped links are downloaded in the background according to a sophisticated schedule of bandwidth priority when the connection between the client and the server is idle, and stored in a cache on the user's hard drive as Q-Links. The Q-Links stored in the hard drive cache are presented in a list in the interface of the invention. When the user is ready to view the previously selected pages, the user can click on any of the Q-Links in the list, which displays that content directly from hard drive cache to the browser. Since the requested pages now come from the hard drive instead of from across the Internet, the method significantly reduces or eliminates the user's wait time for downloading.

BRIEF DESCRIPTION OF THE DRAWINGS

For a more complete understanding of the present invention, and the advantages thereof, reference should be made to the Detailed Description taken in connection with the accompanying drawings in which.

DETAILED DESCRIPTION OF THE INVENTION

I. Overview

Figures 1, 20:
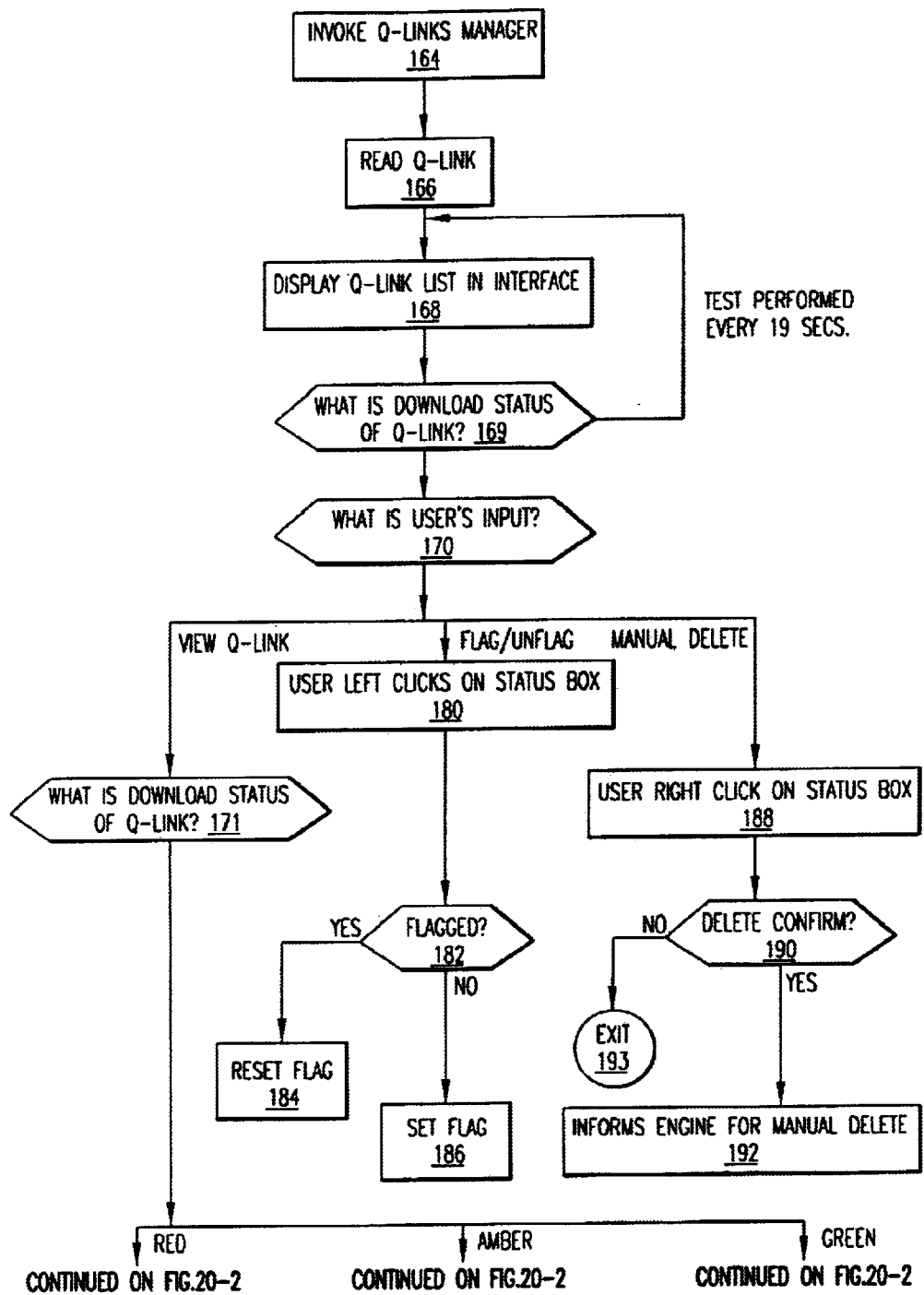
FIG. 1 illustrates the computer network in which the present invention is utilized.
FIG. 20 is a flowchart diagram of the Q-Links manager.
Figures 2, 20:
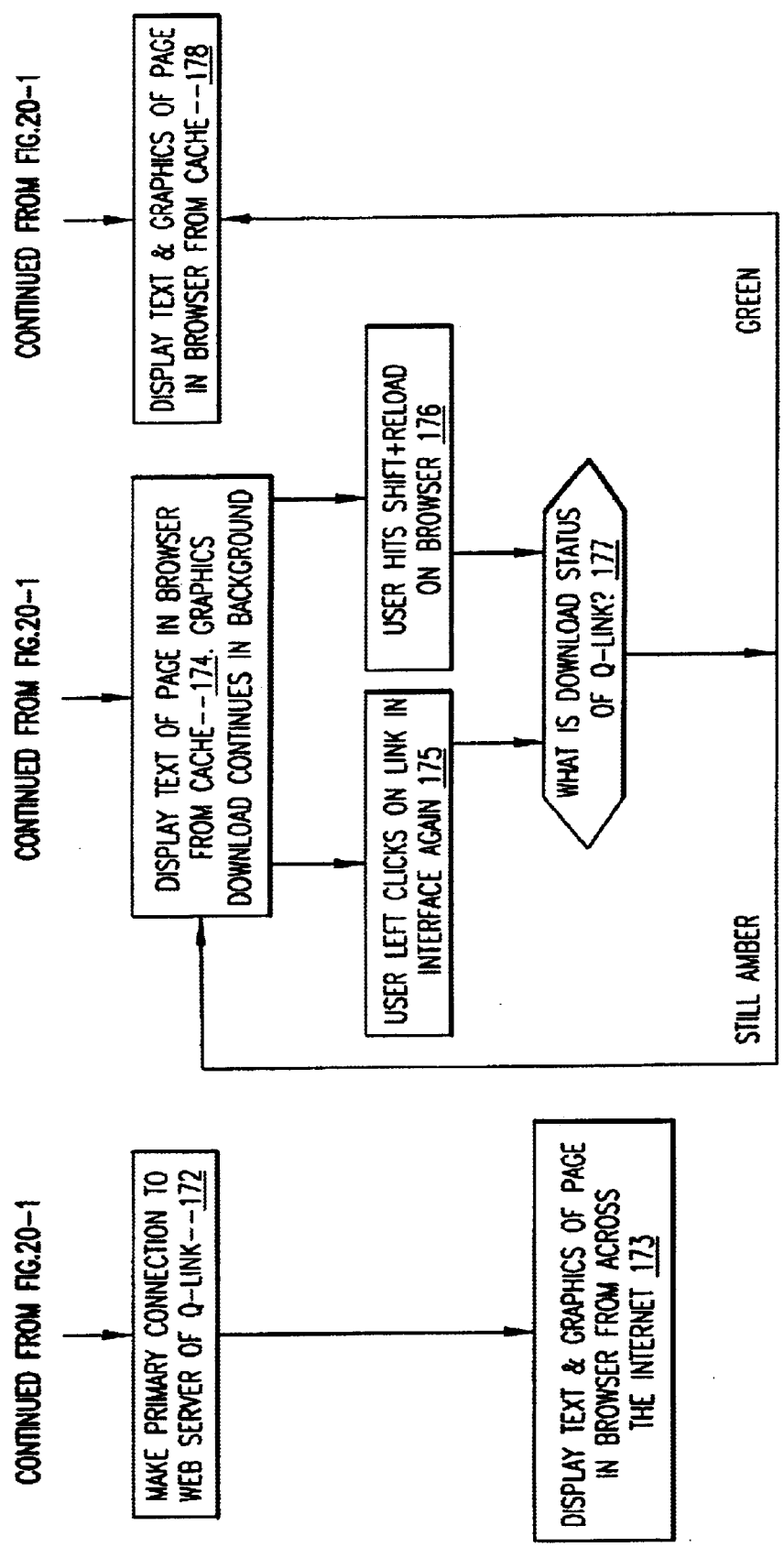

As represented in FIG. 1, the Internet is a known computer network based on the client-server model. The Internet comprises a large network of servers 10 which are accessible by "clients" 12, typically the personal computers of users, through an Internet Service Provider (ISP) 14 (such as Internet America, NetCom and the like) or an Online Service Provider (OSP) 16 (such as America Online, Prodigy, Microsoft Network, CompuServe and the like). Each of the client computers runs a Web browser, which is a known software tool used to access the World Wide Web servers of the Internet via the ISPs and OSPs. A server 10 is host to a so-called Web site which supports files in the form of documents and pages. A network path to a server is identified by a so-called Uniform Resource Locator (URL) having a known syntax for defining a network connection.

The World Wide Web (WWW) is a collection of servers 10 of the Internet that utilize the Hypertext Transfer Protocol (HTTP). HTTP is a known application protocol that provides users access to files (which can be in different formats such as text, graphics, images, sound, video, etc.) using a standard page description language known as Hypertext Markup Language (HTML). HTML provides basic document formatting and allows the developer to specify "links" to other servers and files. Use of an HTML-compliant client browser involves specification of a link URL. Upon such specification, the client 12 makes a TCP/IP request to the server 10 identified in the link and receives a "Web page" (a document formatted according to HTML) in return.

Figure 2:
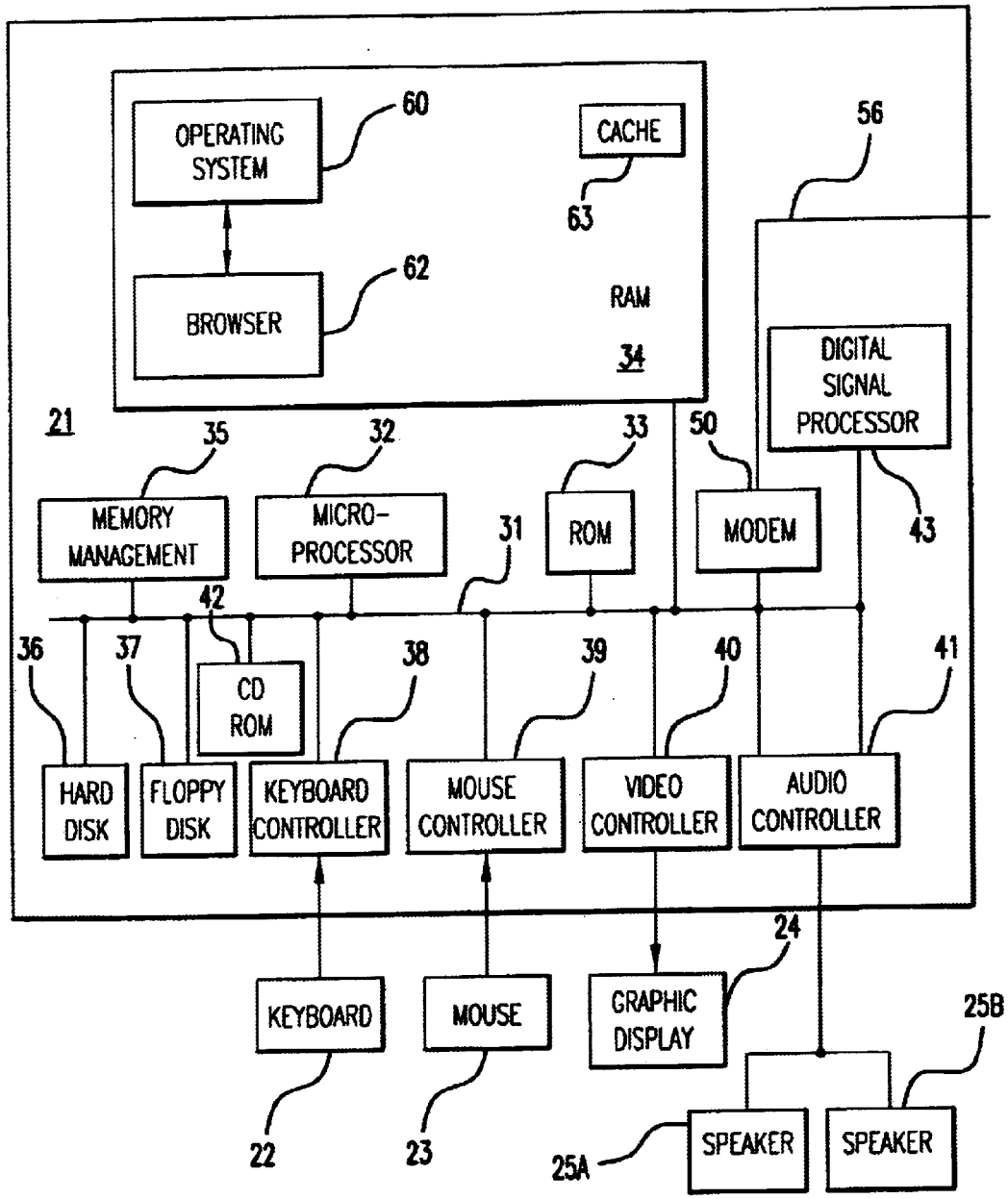
FIG. 2 illustrates a client computer supporting network and Internet connections.

FIG. 2 shows a block diagram of a representative "client" 12 computer in which the present invention is used. The system unit 21 includes a system bus or plurality of system buses 31 to which various components are coupled and through which communication between the various components is accomplished. A microprocessor 32 is connected to the system bus 31 and is supported by a read only memory (ROM) 33 and a random access memory (RAM) 34, also connected to the system bus 31. The ROM 33 contains, among other codes, the Basic Input-Output System (BIOS), which controls basic hardware operations such as the interaction with the disk drives and the keyboard. The RAM 34 is the main memory into which the operating system and application programs are loaded. A memory management chip 35 is connected to the system bus 31 and controls direct memory access operations including, passing data between the RAM 34, a hard disk 36, and a floppy disk drive 37. A CD ROM 42 also coupled to the system bus 31, is used to store large amounts of data, e.g. a multimedia program or large database.

Figure 3:
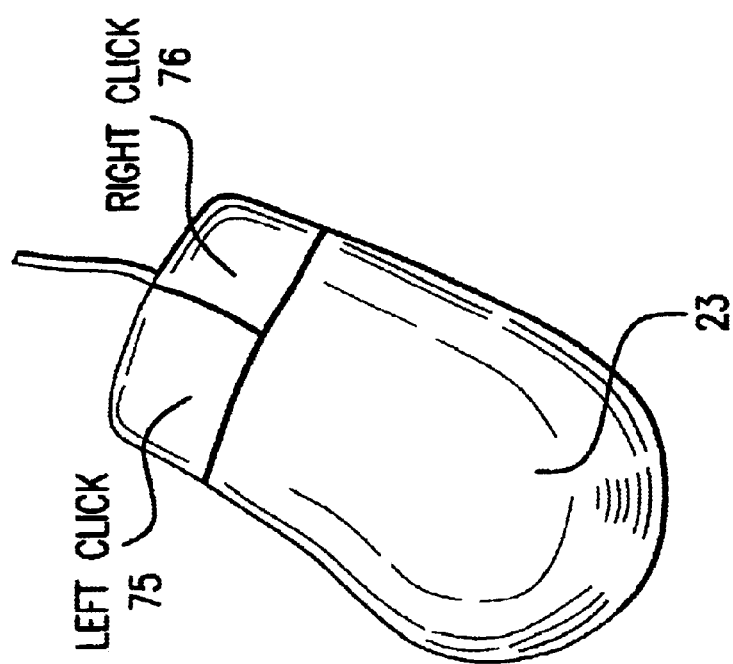
FIG. 3 illustrates a mouse pointing device.

Also connected to this system bus 31 are various I/O controllers: a keyboard controller 38, a mouse controller 39, a video controller 40, and an audio controller 41. The keyboard controller 38 provides the hardware interface for the keyboard 22; the mouse controller 39 provides the hardware interface for a mouse (or other point and click device) 23; the video controller 40 is the hardware interface for a display 24; and the audio controller 41 is the hardware interface for speakers 25a and 25b. A modem 50 enables communication over a network 56 (such as the Internet) to other computers over the computer network. The mouse 23 is illustrated in FIG. 3, where a left click button 75 and a right click button 76 are shown.

Figure 4:
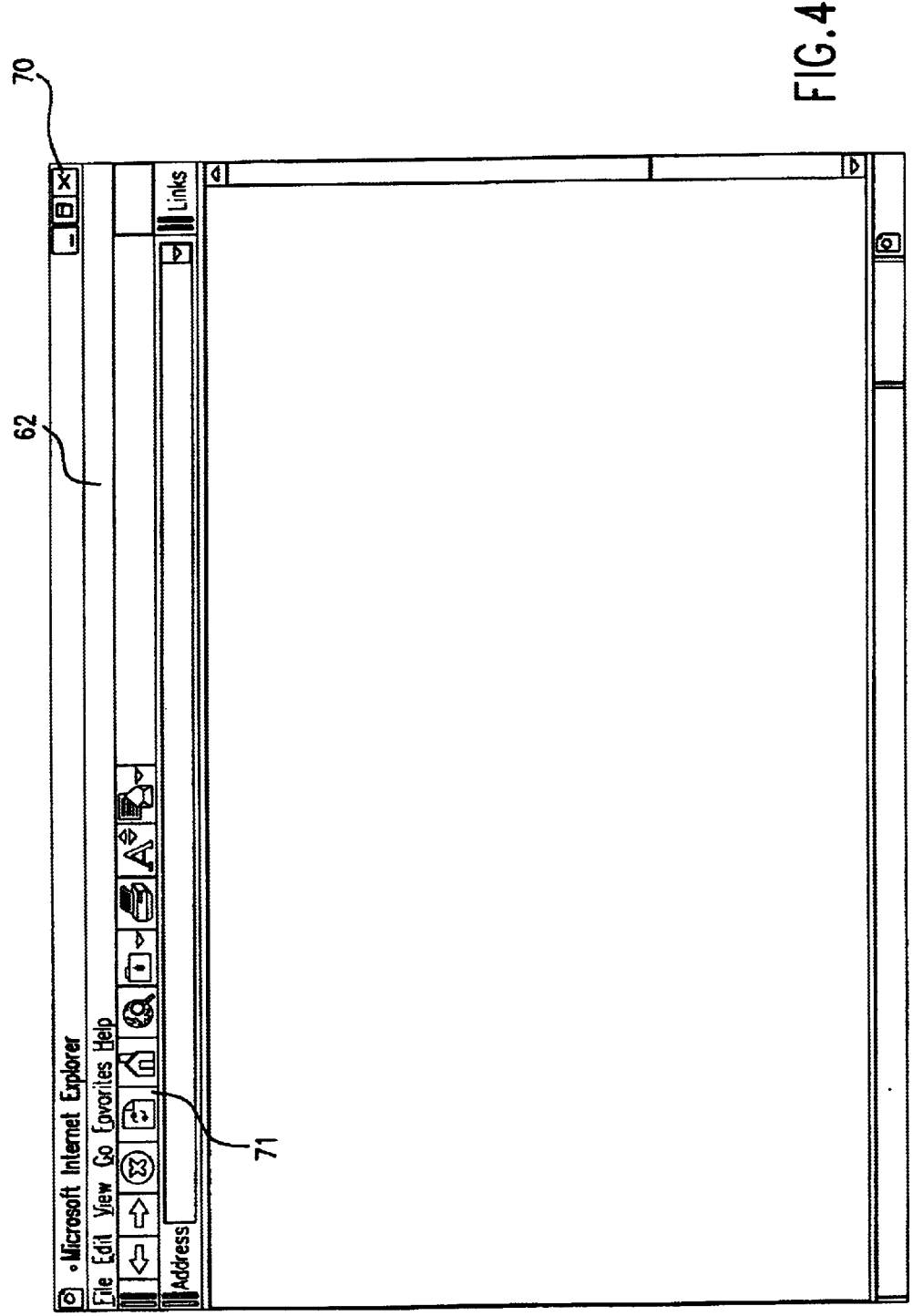
FIG. 4 is a representative graphical user interface of a Web browser.

An operating system 60 of the computer may be DOS, Windows 3.x, Windows 95, Windows NT, Mac OS, OS/2, AIX or any other known and available operating system, and each computer is sometimes referred to as a machine. The RAM 34 also supports a number of Internet access tools including, for example, an HTML-compliant Web browser 62. Known Web browser software includes Netscape Navigator, Netscape Communicator, Microsoft Internet Explorer, and the like. The Web browser 62 typically includes a graphical user interface. A representative graphical user interface of a Web browser is illustrated in FIG. 4. The present invention is designed to operate in accompaniment with any of these known or developing web browsers, whose functionality is enhanced as described herein to achieve the increased performance and utilization of the Internet, and a reduction of user time during Internet use. The RAM 34 may also support other types of Internet client software, including Simple Mail Transfer Protocol (SMTP) or E-Mail, File Transfer Protocol (FTP), Network News Transfer Protocol (NNTP) or "Usenet," and remote terminal access (Telnet).

The HyperText Markup Language (HTML) of the World Wide Web uses so-called "tags," denoted by the ◊ symbols, with the actual tag between the brackets. Most tags have a beginning (<tag>) and an ending section, with the end shown by the slash symbol (</tag>). There are numerous link tags in HTML to enable the viewer of the document to jump to another place in the same document, to jump to the top of another document, to jump to a specific place in another document, or to create and jump to a remote link (via a new URL) to another server. Links are typically displayed on a Web page in color and/or with an underscore. In response to the user pointing and clicking on the link with the mouse 23, the link is said to be "activated" and begins the download of the linked document or text. For more details on HTML, the reader is directed to the HTML Reference Manual, Published by Sandia National Laboratories or the HTML Quick Reference, published by the University of Kansas. Each of these publications are incorporated herein by reference.

Figure 5:
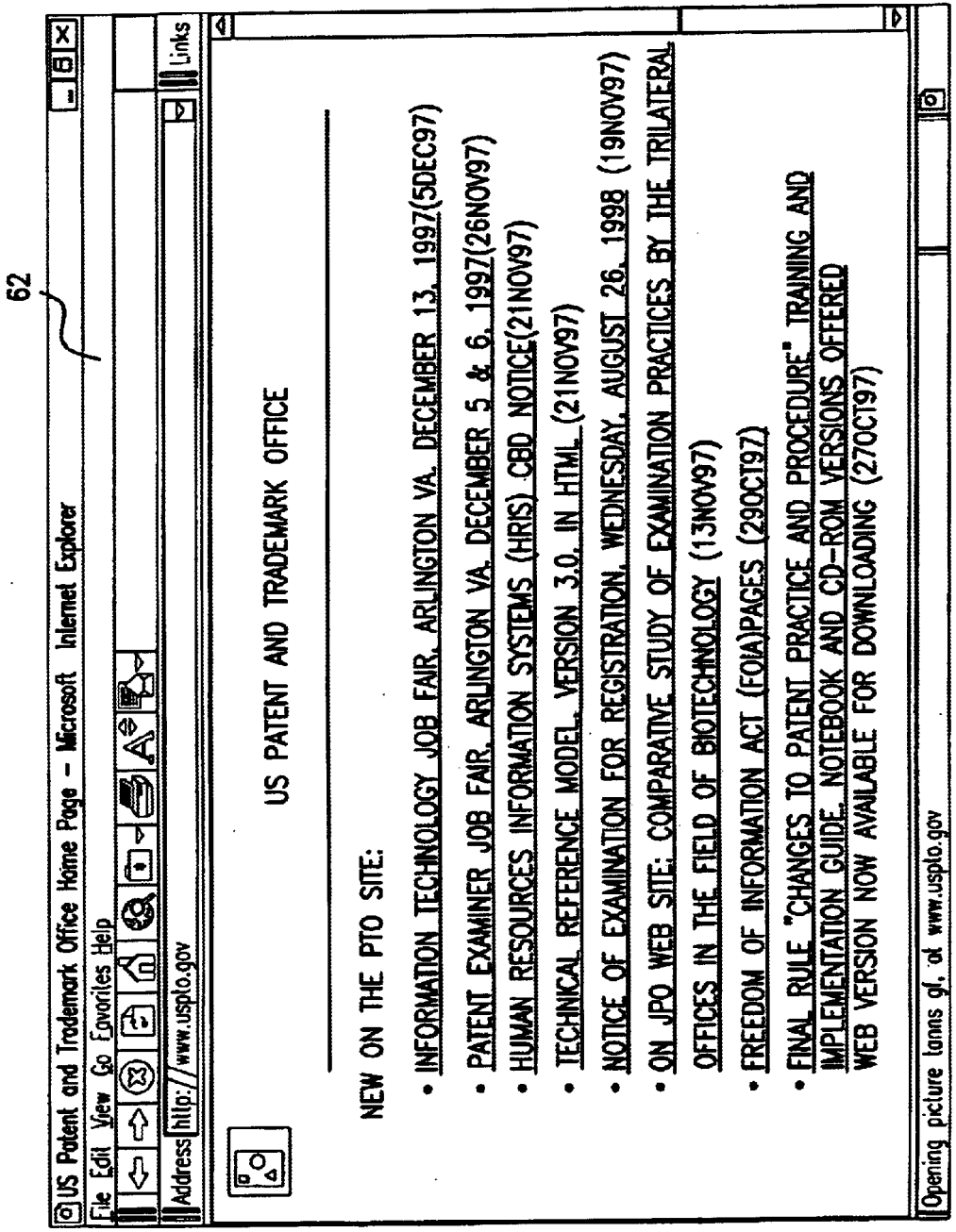
FIG. 5 is a representative Web page illustrating hypertext links.

As noted above, the Web browser 62 running on the client 12 uses a TCP/IP connection to pass a request to a Web server running a HTTP "service" (under the Windows operating system) or "daemon" (under the UNIX operating system). The HTTP service then responds to the request, typically by sending a "Web page" formatted in HTML to the browser 62. The browser 62 then displays the Web page using local resources (e.g., fonts and colors) on the graphic display 24 of the client computer 12. The graphic display of a Web page with hypertext links in the Web browser 62 is shown in FIG. 5.

The invention is designed to enhance browsing on the World Wide Web by making better use of the connection over the network 56 between the clients 12 and the servers 10. This is done by allowing users to issue secondary connections between the invention and the servers 10, to retrieve Web pages in the background while the user is viewing Web pages currently shown on the graphic display 24. The issuance of secondary requests is performed by "dragging-&-dropping" links in Web pages onto an interface of the invention with the mouse 23 or other pointing device.

Figure 6:
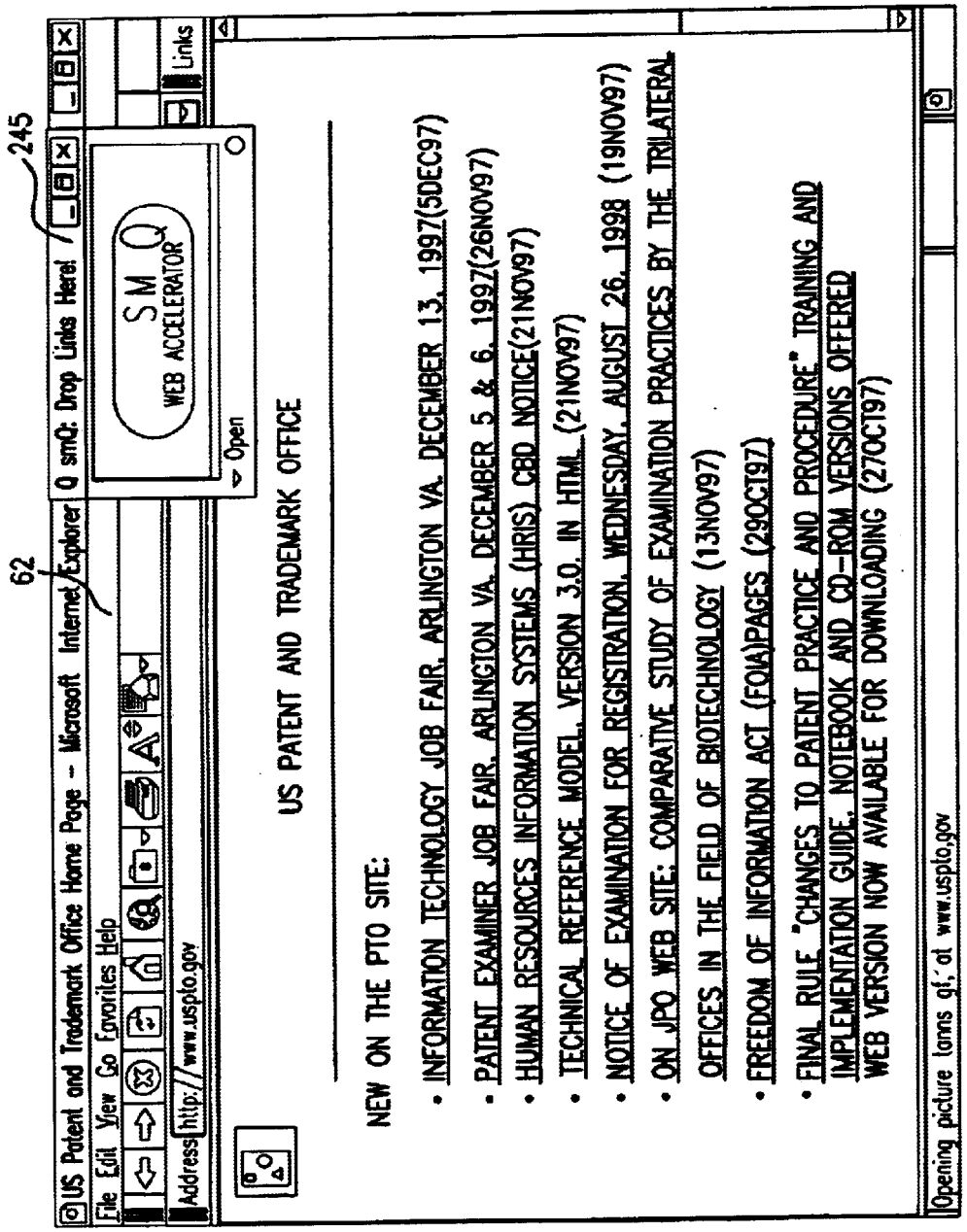
FIG. 6 is a representative browser with the invention graphical user interface (GUI) displayed.

FIG. 6 illustrates a current Web page being displayed on the browser 62 while an minimized graphical user interface (GUI) 245 of the invention "floats" above the window of the browser 62. The minimized graphical user interface (GUI) 245 of the invention is depicted in more detail in FIG. 7. Clicking with either the left mouse button 75 (or equivalent left mouse button process on the user's pointing device), on the border 246 of the minimized interface 245, or clicking with the left mouse button 75 (or equivalent left mouse button process on the user's pointing device) on the down arrow 255 opens the interface 245 up to its maximized state 251 as shown in FIG. 8. Notice that the down arrow 255 is now depicted as an up arrow in the maximized GUI 251. This indicates to the user to click on the arrow to minimize the interface. To close the maximized GUI 251, the user either clicks with the left mouse button 75 (or equivalent left mouse button process on the user's pointing device) on the border 246 of the interface, or clicks with the left mouse button 75 (or equivalent left mouse button process on the user's pointing device) on the up arrow 255.

On both the minimized GUI 245 and the maximized GUI 251, an ad display area 247 displays ads in 2-minute rotation. On both the minimized GUI 245 and the maximized GUI 251, a background request indicator 250 is green when no background downloads are being performed, and changes to red when background requests are being processed. On both the minimized GUI 245 and the maximized GUI 251, if the user clicks on the left of the three blue window bar icons 248 of the interface, the GUI in either maximized or minimized state, will be reduced to the Task Bar of the Windows operating system for a period of 60 minutes. After 60 minutes, the interface reappears on the user's screen wherever if was when it was originally reduced to the Task Bar. The other buttons in the Task Bar are not active, per normal Windows operating system functionality, and may not be activated by the user. Should the user wish to quit the application, per normal Windows operating system functionality, he/she uses the "X" blue window bar icon of the browser 62, which, when the invention has been installed by the user, also controls the quit procedures of the invention. This feature exists to ensure maximum viewership of the advertising displayed in the invention's interface.

The maximized GUI of the invention 251 displays a list 261 of the Q-Link and Q-Touch content to be downloaded, downloading, or downloaded in the background.

If the user clicks the left mouse button (or the equivalent) on the "LOGO" that is displayed beneath the list of Q-Links 259, a Web page is downloaded (as a primary download) and displayed in the open instance of the browser 62 with the homepage of the company which distributes the particular edition of the invention. If the user left clicks (or the equivalent) on the "smQ LOGO" button 259 (which will often carry the same logo as described above depending on specific marketing and distribution arrangements), a Web page is downloaded (as a primary download) and displayed in the open instance of the browser 62 with a company Web page containing user updates about tips on using the invention, and advances in the invention's technology. If the user left clicks (or the equivalent) on the "Infoseek LOGO" button 258, a Web page is downloaded (as a primary download) and displayed in the open instance of the browser 62 with the homepage of the Infoseek Internet search engine, or the homepage of the appropriate search engine partner for the specific edition of the invention. If the user left clicks (or the equivalent) on the "HELP" button 253, a Web page is downloaded (as a primary download) and displayed in the open instance of the browser 62 with the technical support amenities for the users of the invention. If the user left clicks (or the equivalent) on the three numbered buttons 252, 254, and 256, the updated versions of the user's three favorite Web pages are displayed. This is discussed in further detail below.

The primary functions of the invention are as follows:

(1) Manage and allocate bandwidth between the primary connection (HTTP requests issued from the browser 62), the secondary connection (HTTP requests issued by dragging-&-dropping hyperlinks on the interface 246 of the invention), and other connection requests issued by other HTTP clients present in the invention (the term "client" is also used in its more technical mode to describe the individual components of the invention that issue HTTP requests over the network 56). Using the invention's Background Internet Transfer Envoy (BITE), the system constantly looks for idle time on the browser's 62 TCP connection to the network 56, and based upon its built-in priority scheme for serving its clients, this idle time will be utilized to serve other requests;

(2) Storage and access of Q-Links. In the case of any secondary request being initiated by the user dragging-&-dropping a hyperlink from a Web page, the invention generates the appropriate HTTP request, fetches the data from the requested Web server 10, and archives the information in a cache on the user's hard drive 36. Upon receiving page requests from the list of links downloaded in the background (known as Q-Links), the files associated with the request are retrieved from the "local hard drive cache" (as opposed to from across the network), and displayed in the open instance of the browser 62. The capacity of the local cache is determined by the user through the invention's options menu 268 (FIG. 21), and may be modified at any point in time. Once the system determines that its cache is full, it invokes the auto deletion mode on a First In First Out (FIFO) basis, or as according to other parameters of specific cached files;

(3) Q-Touch Page or favorite page download. The user is provided with the facility to declare three of his/her favorite Web pages for regular background downloading and updating (known as Q-Touch pages). The invention implements a dedicated HTTP client, and assigns a unique priority to it for accomplishing this task. The Q-Touch client is invoked when the invention senses idle TCP connection, to connects to the Web servers 10 of the Q-Touch pages and retrieve the files. Upon retrieval, the Q-Touch pages are stored in the hard drive cache of the invention, for subsequent viewing by the user. The Q-Touch client is then invoked on a periodic basis to monitor the status of the servers 10 hosting the Q-Touch pages, and upon sensing any modification in content during this period, it will overlay existing files with the newly fetched ones;

(4) Display of advertising. The interface of the invention 246 displays animated advertising "banners." These advertisements are downloaded periodically across the Internet from a server 10 computer dedicated to managing the advertising of the invention. The time associated with the banner display and the frequency of download from the Web server are controlled by preset parameters of the design;

(5) Uploading Q-Tracks information. Q-Tracks is the system's information warehouse which collects data regarding the display and view time of the advertising banners, and the interactions of the user with the Q-Links and Q-Touch pages. This data is temporarily stored on the local hard drive 36 of the user. The invention periodically implements an HTTP agent which connects to the Web server of the invention to upload the data accumulated.

The invention software is HTTP 1.1 compliant. The interface segment of the invention is implemented in the Visual C++ programming language. The core engine of the invention is implemented as a cross-platform application in Java.

The invention is comprised of the following basic functions: It accepts dropped elements on the interface, deciphers the Internet Address (URL) embedded in it, and issues a background download request in absence of primary connection. It acts as an HTTP 1.1 compliant client for all background download requests. It acts as an HTTP 1.1 compliant client while contacting its own Web server to access the advertising banners. It displays the advertising banners on its interface in rotation. It tracks the interactions of the user with the Q-Links and the advertising banners to generate Q-Tracks information. It manages a local cache in the hard disk of the user's machine, storing all the data related to the files of background downloads, advertising banners, and Q-Tracks data.

A method according to the invention involves background downloading of information from a computer network. The method involves: (a) connecting a client computer to the network. (The client computer typically comprises a monitor, a mouse or other pointing device, a storage device for information, and a modem); (b) retrieving a plurality of information files from the network, opening one of the plurality of files and displaying the information in the file on the client computer monitor; (c) designating information for downloading from the information file onto the storage device by means of the mouse or other pointing device; (d) closing the file containing the information on the client computer monitor; (e) retrieving information from the plurality of other files from the network, opening the files and displaying the information in the file on the client computer monitor; (f) downloading and storing information designated for downloading while information from other files is displayed on the client computer monitor; (g) repeating steps b, c, d, e, and f until all retrieved files are opened on the client computer monitor, all files have been downloaded and placed onto the storage device, and (h) reviewing all files downloaded onto the storage device.

II. Top Level Modules

Figure 9:
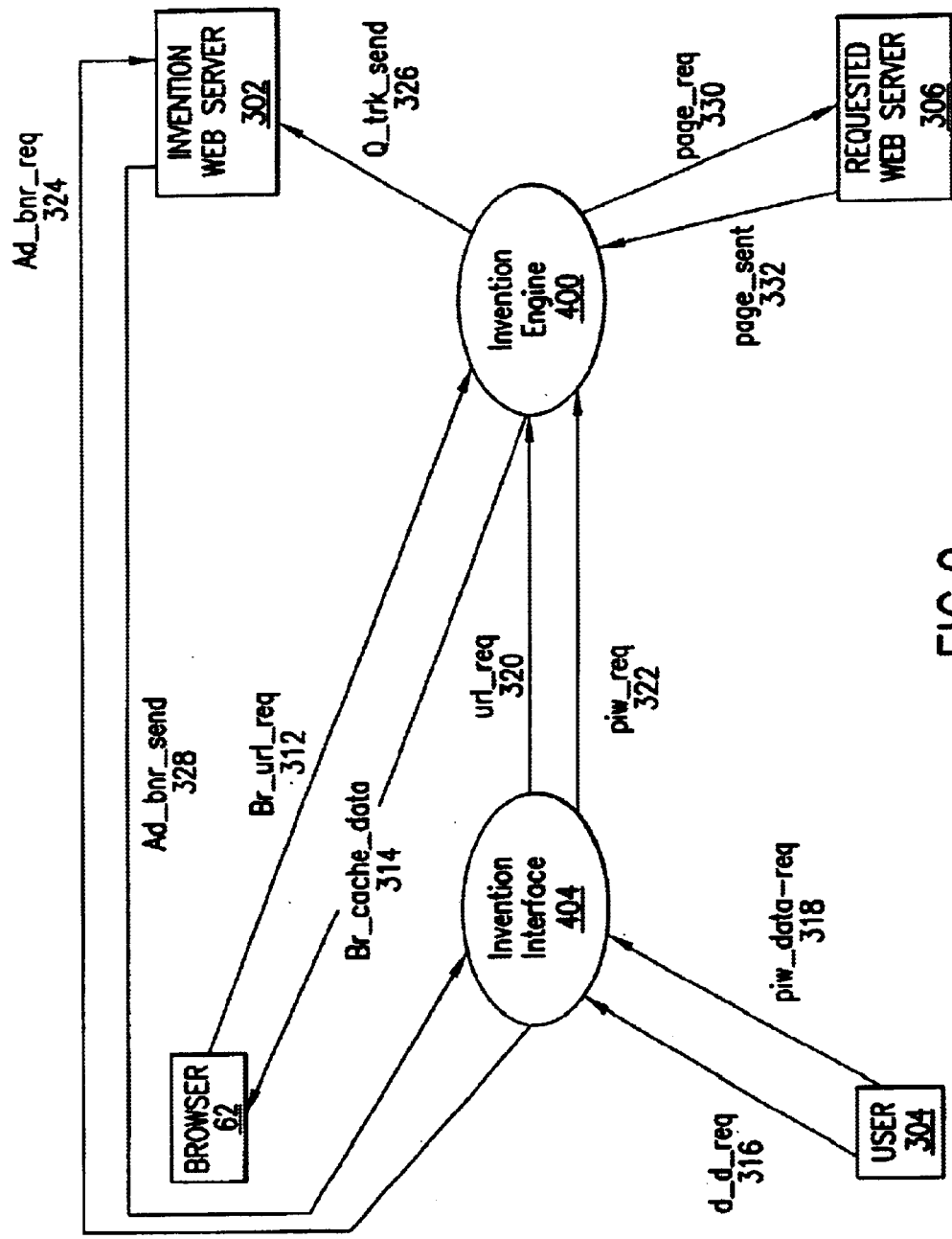
FIG. 9 illustrates the top level flow of the invention.

The individual modules in the top level flow of the invention are shown in FIG. 9. Table 1, below, provides descriptions and attributes for the individual modules shown in FIG. 9.

TABLE 1

| Entity Name | Description | Attributes |
| --- | --- | --- |
| Browser 62 | A Web browser in the user's machine like Netscape Navigator or Internet Explorer | Browser Type + Browser Host Name + Browser Host Address + Host Port # |
| User 304 | The user of the invention | None |
| Invention Web Server 302 | The server providing the advertising banners and receiving/processing Q-Tracks data | SMN Host Name + SMN Host Address + SMN Port # |
| Requested Web Server 306 | The server contacted by the invention for background download | Server Host Name + Server Host Address + Server Port # |
| Invention Interface 404 | The container segment of the invention responsible for collecting user-generated stimuli. | None |
| Invention Engine 400 | The kernel of the invention consisting of HTTP Clients responsible for background download/Q-Tracks info upload and resource managers. | |

The handshaking signals associated with the process of inter-entity communication of the modules shown in FIG. 9 are described in Table 2 below.

TABLE 2

| Signal Name | Description |
| --- | --- |
| Br_url_req 312 | URL request issued by the browser client |
| Br_cache_data 314 | Cached Data sent to the browser by Invention Engine for display |
| Ad_bnr_req 324 | Request from the Invention Interface to the Invention Web Server for advertising banners |
| Q_trk_send 326 | Upload the Q-Tracks info from the Invention engine to the Invention Web Server |
| Ad_bnr_send 328 | Advertising banners sent from the Invention Web Server to the Invention Interface |
| page_req 330 | URL request from the Invention Engine to the Requested Web Server |
| page_sent 332 | The hypertext document sent by the Requested Web Server to the Invention Engine |
| url_req 320 | Forwarding the URL request by the interface to the Invention Engine to activate the BITE Client |
| piw_req 322 | Forwarding the Q-Links display request by the Invention Interface to the Invention Engine for data retrieval from the cache followed by transmission to the browser. |
| d_d_req 316 | Reception of the "drag-and-drop" event fired by the user. |
| piw_data_req 318 | Reception of the Q-Links display request fired by the user. |

Figure 10:
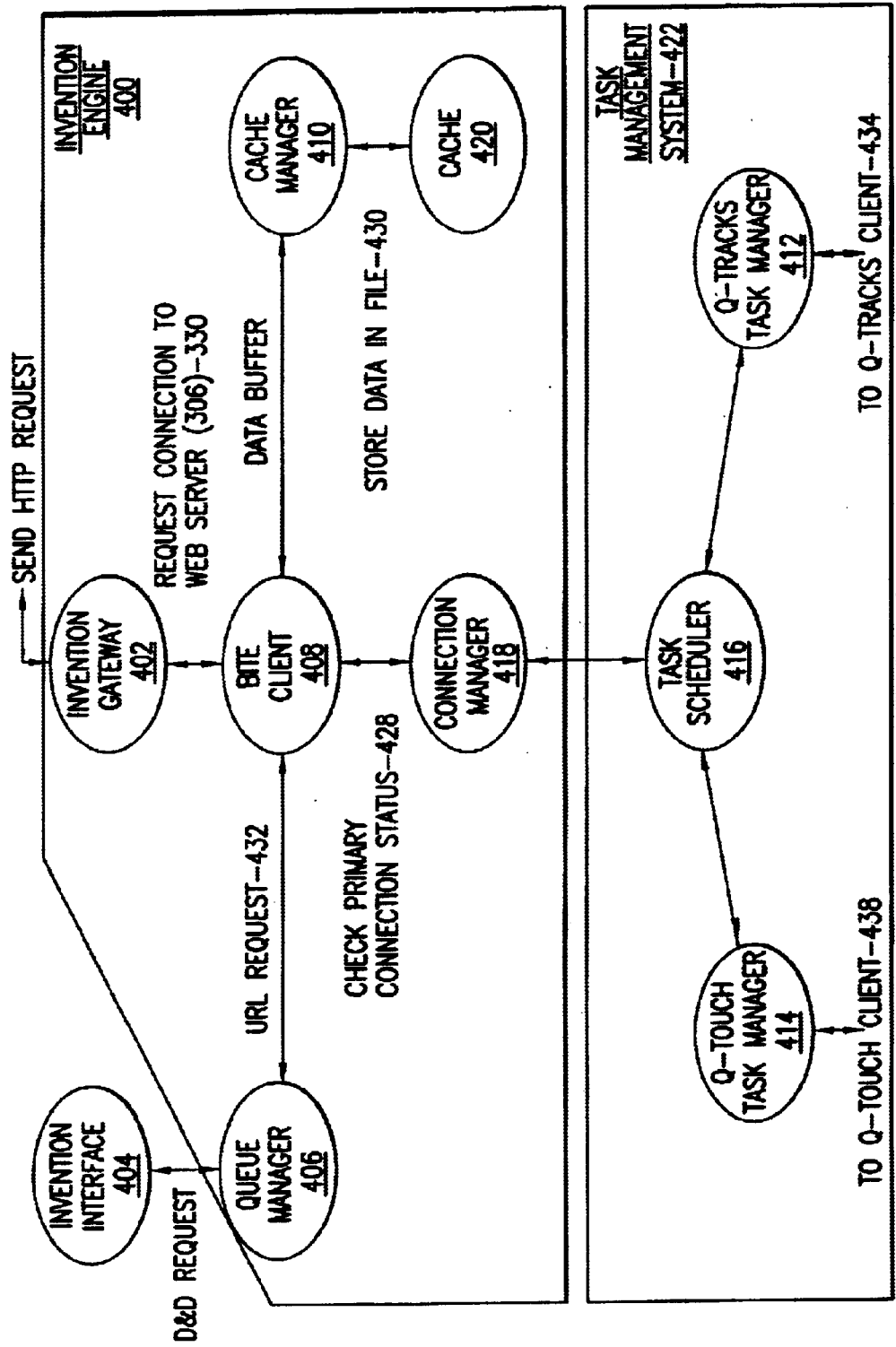
FIG. 10 is a flow diagram for the host of structures that interact with BITE.

The key element of the invention is a BITE Client 408, which is HTTP 1.1 compliant software and instrumental in executing the background download process. The flow diagram for the model along with a host of structures interacting with the BITE Client 408 is shown in FIG. 10. When the process is activated by a drag-&-drop (D&D) request, the BITE Client 408 checks for an idle TCP connection, waits in a loop for a free slot, connects to the requested Web Server, fetches data, and stores the data in the invention's hard drive cache with proper file structure.

The invention essentially consists of two major components with the following specifications:

The first component is an Invention Interface 404. This component is the implementation of the user interface acting as a container onto which users can D&D hyperlinks. The container carries the sole responsibility of trapping all user interactions with the system and invokes the appropriate entity based on the user-generated stimulus.

The second component is an Invention Engine 400. This component is the cross-platform implementation, and is the integral component of the invention. Its primary responsibility is to interact with the Invention Interface 404 to take relevant actions based on the requests passed by this component.

The following is a summary of the handshaking signals between the Invention Interface 404 and the Invention Engine 400: Drag and Drop Request; Get Drop Status; Manual deletion request (URL); Flag/Unflag URL (URL); Invoke auto-deletion; Update Preference file; Get local cache path for Q-Link (URL); Get the list of Q-Links; Get ImageMap URL list; Put ImageMap URL list; and, Give Cache Full Alert.

The functionalities of the Invention Interface 404 are as follows: The Invention Interface 404 collects stimulus from the browser 62 in the form of D&D hyperlinks and invokes background download. Upon the receipt of a URL request for secondary downloading, the Invention Interface 404 determines the nature of the request string as one of the following: Text Link, Image Link, Image Map (as discussed in greater detail below). In the event it detects the request as an image map (i.e. a graphic containing multiple links), the Invention Interface 404 collects the array of URLs embedded in the element, displays the list to the user for selection, and passes the selected URLs onto a Queue Manager 406.

The Invention Interface 404 also tracks user movements for generating Q-Tracks information both for Q-Links, and Q-Touch pages (as discussed in greater detail below).

The Invention Interface 404 gathers delete requests from the user. The user is given the option to manually delete the contents associated with a link downloaded in the background. If no manual deletions are performed, the Invention Interface 404 checks for the "Cache Full" condition before issuing a secondary request. If a "Cache Full" alert is received from the Cache Manager 410, the container prompts the user to adopt one of four options to clean up the existing cache. If no "Cache Full" alert is received, the Cache Manager 410 invokes an automatic deletion process to delete a set of links based on a FIFO algorithm (as discussed in greater detail below).

The Invention Interface 404 receives stimuli from the user for display of cached Q-Links in the open instance of the browser 62. When the user selects a link from the Q-Links list 261 (FIG. 8) displayed in the Maximized Graphical Interface 251 (FIG. 8), the Invention Interface 404 produces the local cache path for the specified link by consulting the contents of the log file maintained by a Cache Manager 410.

The Invention Interface 404 interacts with the BITE Client 408 for invoking background downloads. The Invention Interface 404 interacts with the Cache Manager 410 for retrieving data from the cache to display in the browser 62. The cached data may include a Q-Link or an advertising banner. The Invention Interface 404 interacts with the Browser 62 for "Help" and other Invention Interface buttons (see FIG. 16). The Invention Interface also interacts with a Q-Tracks Task Manager 412 for archiving Q-Tracks information.

The BITE Client 408 is a HTTP 1.1 complaint client capable of generating HTTP requests to Web servers 306 (see the process in FIG. 9, 330) for enabling background downloading. The BITE Client 408 enables background downloading by passing the HTTP Request to an Invention Gateway 402. When the BITE Client 408 receives data from the requested Web server it invokes the Cache Manager 410 for their storage 430.

The BITE Client 408 consults a Connection Manager 418 to get the status of the primary connection 428. If the primary connection is active, it suspends the BITE operation, waits in a loop for a free TCP connection, and resumes the background download once the primary request has been completely served.

The BITE Client 408 consults the Queue Manager 406 for receiving URL requests 432 from the user. The BITE Client 408 waits in a loop for new URL requests 432.

The Cache Manager 410 is the basic memory manager entity in the whole design which interfaces with all HTTP Clients for storage of data. All background data is downloaded to a cache on the hard drive of the user's computer. The Cache Manager 410 performs all Cache Management-related tasks, such as storing data in appropriate paths, logging, deleting files, etc.

The Cache Manager 410 stores the resources obtained from the requested Web Server in a unique local path of the user's machine. The Cache Manager 410 maintains a log book of mapping between the downloaded URL (entry in Q-Links list) and the local path in the cache on the hard drive of the machine. The Cache Manager 410 deletes all files associated with a given download (URL) once a delete request is passed to it. The Cache Manager 410 also keeps track of the total hard drive consumption of the Cache 420. It sends a "Cache Full" alert once the total storage exceeds a certain threshold.

The Cache Manager 410 also indirectly interacts with the BITE Client 408, a Q-Tracks Client 434, and a Q-Touch Client 438. The Q-Touch information is stored within the Cache 420 according to the Cache Manager 410. The Q-Tracks information is also stored within the Cache 420 according to the Cache Manager 410.

Whenever a secondary download request is initiated by the user, the Invention Interface 404 consults the Cache Manager 410 (via the Queue Manager 406 and the BITE Client 408) to determine the feasibility of the new download, i.e., whether the current cache consumption is within the threshold of the total cache capacity. If a "Cache Full" condition is detected, the invention prompts the user with the following options for enabling the current download:

1. Cancel all flags in Q-Links list;
2. Go through Q-Links and cancel selected flags;
3. Increase your storage limit;
4. Ignore the message.

The algorithm for detecting "Cache Full" is given below:

if (currentCacheSize>=(totalCacheSize-CACHE_THRESHOLD)) {return cacheFull;
}else return cacheLeft;

If the user selects option 1, cancel all flags in Q-Links list, the Cache Manager 410 invokes its auto-deletion mechanism to generate cache space for accommodating the new download.

The CACHE_THRESHOLD is defined as the minimum residual memory kept as a safety margin. The NORM_CACHE_RESIDUE is defined as the maximum memory that can be released through auto-deletion.

The steps in the algorithm for auto-deletion are given below:

1. Generate a list of Unflagged URLs from Q-Links list;
2. Sort the URLs based on the "Last View Time" field stored in the cache log file in descending order of magnitude, i.e., the first element of the list contains the URL which was Least Recently Viewed (LRV);
3. Delete all the files associated with the first element of the list;
4. Compute the current cache size, compute the quantity (total cache size B current cache size) and check whether it exceeds NORM_CACHE_RESIDUE;
5. If the answer to (4) is "No", goto step (3);
6. Else stop.

The parameter NORM_CACHE_RESIDUE is kept for fine-tuning the auto-deletion algorithm to maintain a value which is neither too large or too small. A large value for the parameter will result in deletion of more Q-Link URLs than the user might have desired. A smaller value, on the contrary, will result in frequent "Cache Full" messages, and would have an unsettling effect on the user.

The Queue Manager 406 gets D&D requests from the Invention Interface 404 and stores them in the queue to be used exclusively in connection with BITE downloading. The Queue Manager 406 interacts with the Invention Interface 404 and the BITE Client 408.

The Connection Manager 418 is the priority resolver for the whole system. Once it receives any connection request from any client (the term "client" is also used in its more technical mode to describe the individual components of the invention that issue HTTP requests over the network 56), it checks the status of other connections to find a free slot in the hierarchy. Once available, it checks whether any other connection with higher priority exists at that moment. If no, the connection is established. Once established, the connection is maintained until another request of higher priority arrives, at which point the previous connection is suspended to allow the new request to be processed.

The priority scheme for the Connection Manager is as follows in descending order of priority:

1. Primary download request issued by the browser 62;
2. BITE download request activated by D&D;
3. Advertising banner downloads from the Invention Web Server 302;
4. Q-Touch page download for "Q-Touch 1";
5. Q-Touch page download for "Q-Touch 2";
6. Q-Touch page download for "Q-Touch 3";
7. Q-Tracks information upload from the invention to the Invention Web Server 302.

The Invention Gateway 402, as shown in FIG. 10, sits at the topmost level of the architecture and is responsible for routing all HTTP requests. All requests issued from all clients (the term "client" is also used in its more technical mode to describe the individual components of the invention that issue HTTP requests over the network 56), are routed through this entity for connection with the Requested Web Server 306, as shown in FIG. 9. The Invention Gateway accepts HTTP requests from the clients (the term "client" is also used in its more technical mode to describe the individual components of the invention that issue HTTP requests over the network 56), and passes the Request Header to the Requested Web Server 306. After receiving a block of data from the Requested Web Server 306, it tunnels the information to the appropriate client (the term "client" is also used in its more technical mode to describe the individual components of the invention that issue HTTP requests over the network 56), without manipulating it in any way, thereby ensuring no additional delay in the communication path.

A Task Management System 422, as depicted in FIG. 10, is one of the key elements in the whole design of the invention. In contrast with the functionalities of the primary (Browser 62) and secondary (BITE 408) download agents, the network operations for the remaining clients—the Q-Tracks Client 434 and the Q-Touch Client 438—are not invoked by the user explicitly. The operations are only activated automatically when there is need to do so. As an example, the Q-Touch Client 438 invokes a download procedure for retrieving a Q-Touch page from a Requested Web Server 306, as seen in FIG. 9, only after the passage of a pre-determined period of time or other sets of parameters (as discussed in greater detail below).

The Task Management System 422 is an entity which continuously runs in the background to check whether there exists any need for activating a data transfer process. If yes, it consults the Connection Manager 418 to resolve priority of downloads and invokes the relevant client (the term "client" is also used in its more technical mode to describe the individual components of the invention that issue HTTP requests over the network 56) responsible for the data transfer.

The Task Management System 422 also interacts with the Q-Tracks Client 434, as shown in FIG. 10, for uploading user interaction data to the Invention Web Server 302. The Task Management System 422 also interacts with the Q-Touch Client 438 for periodically downloading the three favorite Web pages as specified by the user. The Task Management System 422 interacts with the Connection Manager 418.

The basic components associated with the Task Management System 422 are a Task Scheduler 416, a Q-Touch Task Manager 414 and the Q-Tracks Task Manager 412 for the Q-Touch Client 438 and the Q-Tracks Client 434.

The Task Scheduler 416 is a built-in entity in the Task Management System 422 whose sole responsibility is to communicate with the Connection Manager 418 to gather the status of the primary and the secondary connections, as depicted in FIG. 10 at 428. If both the connections are idle at any point of time, it polls the Task Managers associated with each HTTP Client other than BITE (Q-Touch, and Q-Tracks [438 & 434 respectively])

Figure 11:
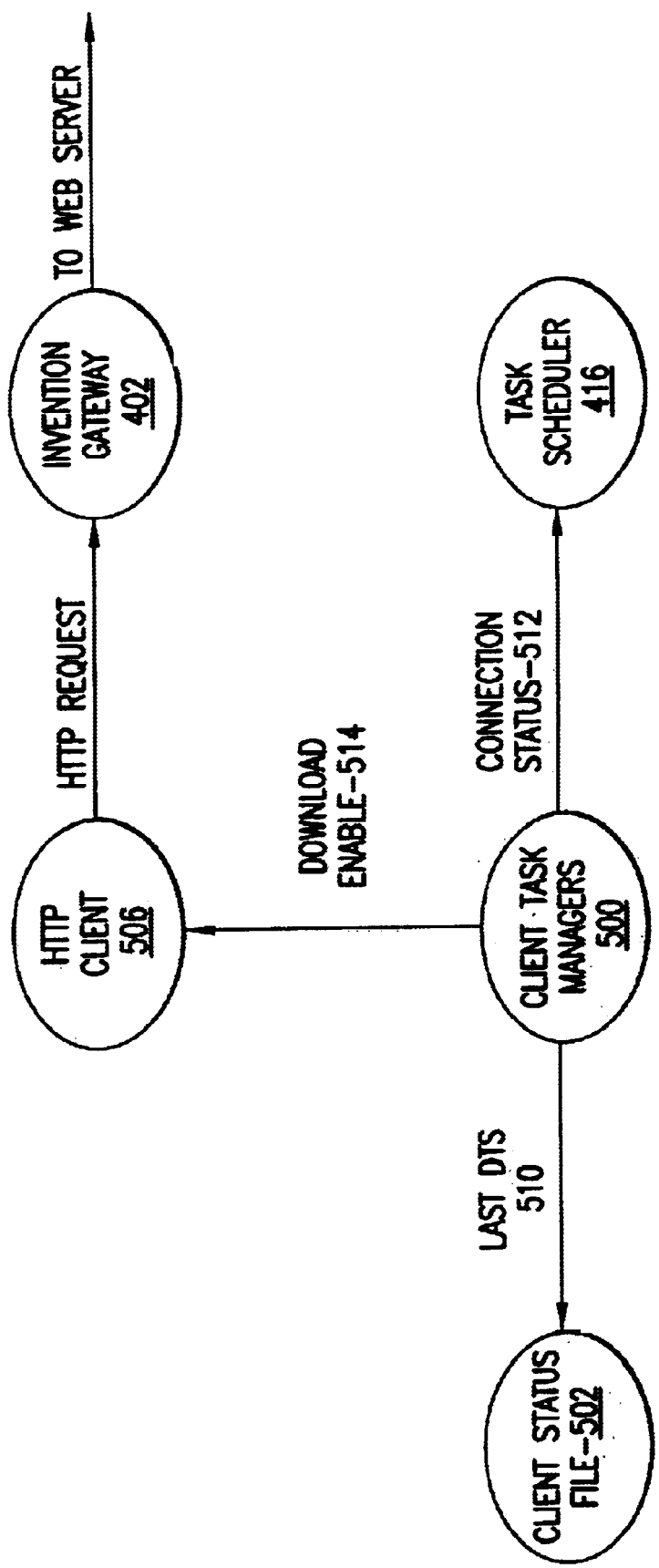
FIG. 11 shows the basic flow of operation for a Task Manager.

The basic flow of a Task Manager is shown in FIG. 11. At the time of the activation of the invention, a Task Manager determines the necessity for any network activity for the set of clients 500 under its supervision (Q-Touch, and Q-Tracks Task Managers 414 & 412, respectively).

Figure 7:
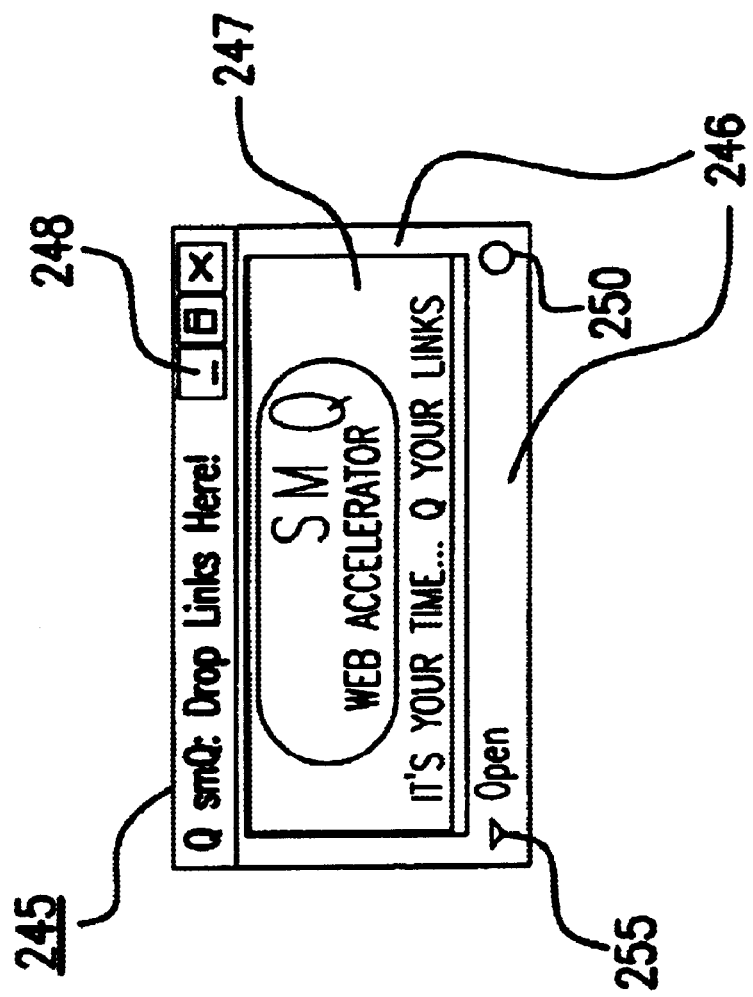
FIG. 7 illustrates the closed GUI of the invention.
Figure 8:
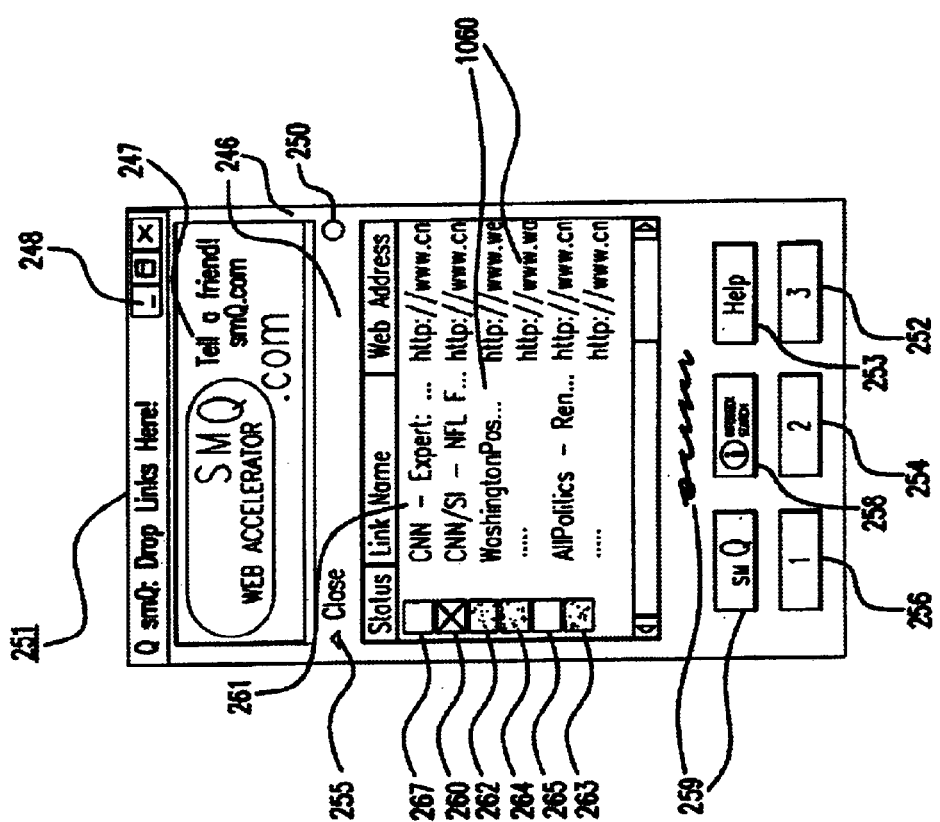
FIG. 8 illustrates the open GUI of the invention.

The functionality of the two Client Task Managers is depicted in FIGS. 6 and 7. The Q-Touch Task Manager 414 and the Q-Tracks Task Manager 412 can be described by the following steps: Client Task Managers 500 are invoked by the Task Scheduler 416 when the TCP line is free; They consult a Client Status File 502 to fetch the Date Time Stamp (DTS) when the "Last Download" has occurred 510. They compute the current time interval as (Current DTS—Last DTS) and compare the result with a preset threshold (the preset thresholds for each of the clients are as follows: Q-Touch Task Manager 414—at the beginning of each session and with content update; and, Q-Tracks Task Manager 412—every 36 hours). If the interval exceeds the threshold, the appropriate Client Task Manager (either the Q-Touch Task Manager 414 or the Q-Tracks Task Manager 424) issues a network activity. The Client Task Manager in question checks with the Connection Manager 418 in a loop for higher priority requests. If it detects any, the ongoing network activity is suspended and the other request is served. The suspended activity will resume only when all other higher priority requests have completed their service.

In order to determine if a content change has occurred for Q-Touch updating, the Q-Touch Task Manager 414 has an additional set of routines it must perform. In addition to consulting the Client Status File 502 to check the "Last Download," it detects the "Last-Update" Date-Time stamp from the Requested Server 306 associated with the Q-Touch page. HTTP standards provide a mechanism to extract the Header information from the Requested Web Server 306 in the form of a "HEAD" request. A typical response from a Web server is shown below:

HTTP/1.0 200 OK

Server: Netscape Enterprise/2.01

Date: Wed, 03 Dec 1997 15:24:56 GMT

Last-Modified: Wed, 03 Dec 1997 14:12:43 GMT

Content-type: text/html

Content-length: 15236

By comparing this "Last-Update" information with the "Last Download" stamp in the Client Status File 502 for the particular Q-Touch page, the application can detect the necessity to update the content from the Web server. However, not all Web servers provide the information in the "HEAD" request, resulting in design of additional fall-back action block to decide whether or not to update the Q-Touch page. HTTP standards also supply a facility by which the invention can explicitly request the "Last Update" information by looking into the Requested Web Server's 306 "If-Modified-Since" field. But even this field is sometimes inadequately maintained. In the instance that neither the "HEAD" request nor the "If-Modified-Since" request yields the information necessary to compute the difference between the "Last Update" and "Last Download," the invention adopts a final default mechanism to issue a "GET" request to fetch just the textual content of the requested page. If the size of the text file received differs from the size of the text file in the previously downloaded version, then it will proceed to issue a "GET" request for the entire page, based on the likelihood of a content update given that different text now exists on that page since the Last Download.

As the downloading process of the system is preemptive and priority based, it follows that upon arrival of a higher priority request in the queue, the current process in service will be suspended until the other request has completed its service. The majority of HTTP clients (the term "client" is also used in its more technical mode to describe the individual components of the invention that issue HTTP requests over the network 56) operating in the system are invoked by the Task Management System 422, and they execute at a priority level lower than the primary and secondary clients. The user, however, is not aware of the other background downloads initiated and fulfilled by clients controlled by the Task Management System 422. Therefore, at the point of exiting from the application, it is likely that there will be pending processes belonging to one of those clients. A Process Manager is responsible for making sure that any pending requests which the system may have initiated are wrapped up before exiting the application, or are completed during the next session. It follows therefore that the Process Manager is a separate entity from the rest of the Invention Engine 400 which is invoked only when the user exits the application.

The Process Manager is the entity which performs the following tasks: The Process Manager tracks a pending job, i.e., the last network activity which was suspended due to the user exiting the invention (the "Quit" operation); It identifies the HTTP Client associated with a pending job; It invokes a pending job when a suitable time slot is acquired; The Process Manager identifies the list of pending resources which need to be downloaded to complete a job and issues further HTTP requests, if any, to download the pending resources.

III. Advertising Management System

An Advertising Management System (AMS) of the invention essentially provides the opportunity for companies to advertise products and services on the interface of the system. The invention includes a platform where ad banner display, rotation, scheduling, metering, targeting etc. are integrated with the basic Web accelerator unit, without interfering with download requests issued by other clients (the term "client" is also used in its more technical mode to describe the individual components of the invention that issue HTTP requests over the network 56)

The development of the AMS creates a unique networking environment between the end user and the Invention Web Server 302, enabling the seamless transfer of user-targeted advertising banners.

The AMS provides online network delivery of user registration information to an Invention Back End. The information which is provided includes: user e-mail address with validation; Zip Code; state; country; non-disclosure flag; gender; age; browser choice. The AMS generates a unique profile and ID for the user of the invention. The AMS permits the background delivery of ad banners to the interface container at regular intervals of 2 minutes (thereby ensuring non-interruption of content viewing). The AMS allows for the transmission of ad interaction information from the client to Back End. The AMS delivers an advertiser's Web page to the open instance of browser following a click on the ad banner. The AMS provides for the default delivery of ad banners from a predefined storage area on the user's hard disk in the case of network failure/bottleneck during fetching of an ad from across the network. The AMS also can target ad banners based on demographic information and on web "surfing" patterns.

The communication layer of the AMS between the invention client (the term "client" is used here to describe the software associated with the invention the resides on the user's machine) and its Web Server 302 is HTTP 1.1 compliant. The client side implementation is a cross-platform application and can work under any hardware environment (the term "client" is used here to describe the software associated with the invention that resides on the user's machine). The handshaking protocol between the client (the term "client" is used here to describe the software associated with the invention that resides on the user's machine) and Web Server 302 assumes the existence of a database server with the following parameters: a Valid Internet Address; a repository for ad banners, demographic information, and click information; an interface for designing a schedule for serving ads to the invention, and for presenting tables and graphs based on data reported back from the invention client (the term "client" is used here to describe the software associated with the invention that resides on the user's machine) to the Invention Web Server 302 regarding ad banner interactions.

Figure 12:
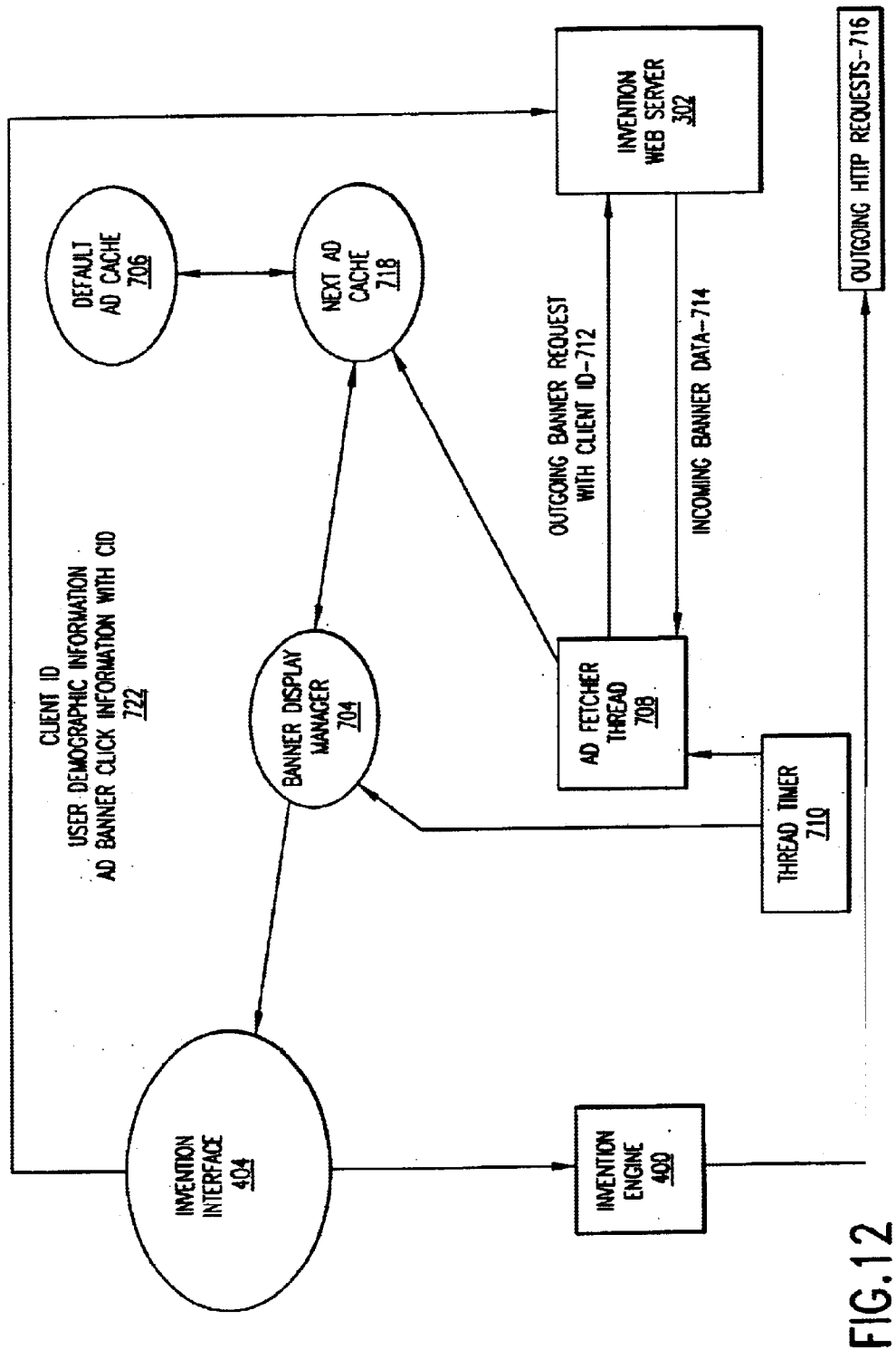
FIG. 12 is a flowchart diagram for the Client End Ad Management System.

As shown in FIG. 12, an Ad banner fetch request is generated by the system timer at a regular interval of 2 minutes. An Ad Fetcher Thread 708 receives an interrupt from a Thread Timer 710. On reception of the interrupt, the Ad Fetcher Thread 708 issues an HTTP request 712 to the Invention Web Server 302 for an ad banner from its repository. The Invention Web Server 302 retrieves an ad banner from its local repository based on user-specific scheduling/targeting parameters. The Invention Web Server 302 sends ad banner data 714 to the Ad Fetcher Thread 708 of the invention client (the term "client" is used here to describe the software associated with the invention that resides on the user's machine). The client (the term "client" is used here to describe the software associated with the invention that resides on the user's machine), after receiving the banner over the network, stores the image file (usually animated GIF format, but all graphics formats are supported) in its preset directory, known as the Next Ad Cache 718. A Banner Display Manager 704 receives notification of the need to acquire a new ad banner from the Thread Timer 710, and then acquires the next banner from the Next Ad Cache 718. The Banner Display Manager 704 passes the ad to the Invention Interface 404 for display of the ad banner in the interface for the next two minute time slot.

When the user clicks on a banner displayed in the Invention Interface 404, the Invention Interface 404 detects the event. On detection, it retrieves a Campaign ID) (CID) associated with the banner file. It transmits (722) the click information with CID as its parameter to the Invention Web Server 302 by invocation of a server specific CGI (common gateway interface). The Invention Web Server 302, upon receipt of the click information, stores it in the appropriate database table, and when requested by an advertiser via the Invention Web Server 302 interface, can produce tables and graphs detailing user response to the ad(s). As the network matures, this information will also be manipulated by the Invention Web Server 302 to target subsequent ad banners according to users' "surfing" patterns.

The AMS design consists of two entities: the invention's ad management system 702 at the client end (the term "client" is used here to describe the software associated with the invention that resides on the user's machine), and an ad management database on the Invention's Web Server 302.

Figure 13:
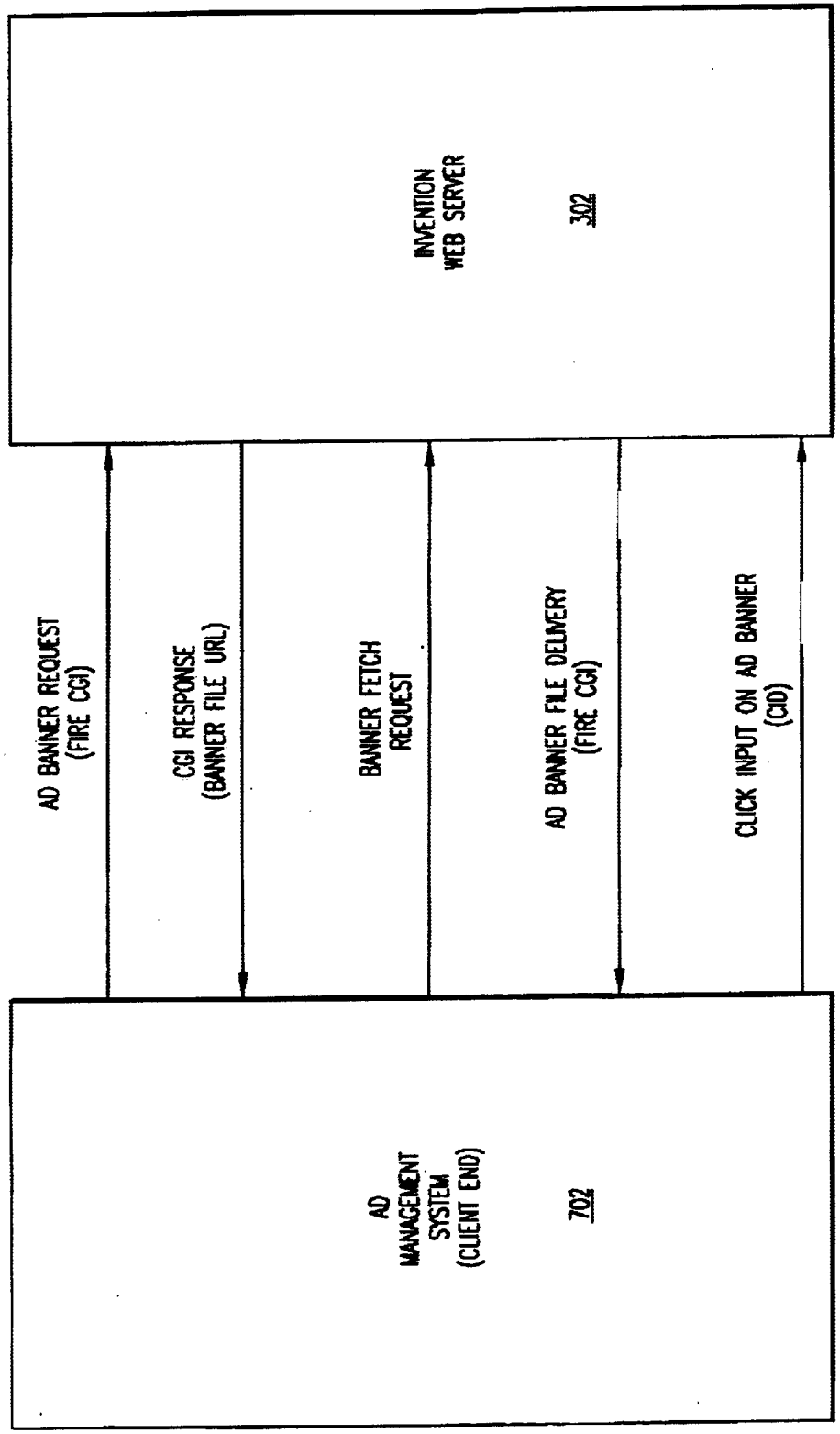
FIG. 13 illustrates the Ad Management Client/Server handshaking protocols

FIG. 13 illustrates the handshaking protocols between these two entities, ensuring reliable data transfer, and the adoption of default activities in the event of network congestion/failure.

The pseudocode for the protocol illustrated in FIG. 13 is described below. The parameters involved in the algorithm are presented in Table 3:

TABLE 3

| | |
|---|---|
| Invention local repository (Default Ad Cache) | :SMQ_LOCAL_REPOS |
| Number of ad banners in the Default Ad Cache | :SMQ_AFS_SIZE (Set to 10) |
| File labeling for default ad banners | :ad0 through ad9 |
| CGI fired to fetch the ad banner URL from Back End | :CGI_BANNER_REQUEST |
| CGI fired to notify the Back End about click on banner | :CGI_CLICK_INPUT |
| Campaign ID for the advertiser 0 | :AD_CID |
| Signal for successful execution of CGI | :CGI_SUCCESS |
| Signal for failure in executing the CGI | :CGI_FAILURE |
| Signal for successful fetching of ad banner | :FETCH_SUCCESS |
| Signal for failure in fetching the ad banner | :FETCH_FAILURE |

Table 4 contains the methodology of the pseudocode.

TABLE 4

```
If(Timer detects end of present time slot)
    Fire CGI_BANNER_REQUEST to the Invention back end;
If(CGI_SUCCESS)
    Extract the ad banner URL from the response data;
    Make HTTP request to Back end for fetching the ad banner file;
If(FETCH_FAILURE)
    Generate a random number from 0-SMQ_AFS_SIZE (say i);
    Choose the default ad banner as ad(i) under SMQ_LOCAL_REPOS;
    Put it under the holding ad banner directory;
    END.
Else if(FETCH_SUCCESS)
    Store the ad banner under the holding ad banner directory;
    END.
Else if(CGI_FAILURE)
    Choose the same action block described above for
    FETCH_FAILURE;
    END.
END.
```

The client-side of the ad management system is implemented in the Java programming language. The AMS runs in parallel with the BITE Engine 408, responsible for serving the D&D requests, at an overall lower priority than the BITE Engine 408. The AMS is implemented as two cascaded components working in tandem. The first component is a listener module, which receives interrupts from the Thread Timer 710 every 120 seconds. Upon receipt of the interrupt, it invokes the second component, the Ad Fetcher Thread 708. The Ad Fetcher Thread 708 then fires the CGI labeled as CGI_BANNER_REQUEST, to the Invention Web Server 302. If it does not receive any response from the Invention Web Server 302 within a preset interval (25% of a 120-second slot), it times out the request. After timing the request out, it reverts back to the default action block and fetches an ad banner from the local ad banner repository (Default Ad Cache 706), labeled as SMQ_LOCAL_REPOS. If it receives a valid response from the Invention Web Server 302 in the predefined slot, it extracts the image URL from the data. It then issues an HTTP request to the server for fetching the ad banner over the network, following the same timeout policy as the handling of an HTTP request. After fetching the ad banner, it stores the image file in the Next Ad Cache 718. The Banner Display Manager picks up the image file from the Next Ad Cache 718 banner directory for display on the Invention Interface 404.

As indicated in FIG. 12, the AMS works in parallel with the BITE Engine 400 at a lower priority. This mechanism ensures that the download times for D&D requests will not be affected in any appreciable way.

IV. Q-Tracks

Figure 14:
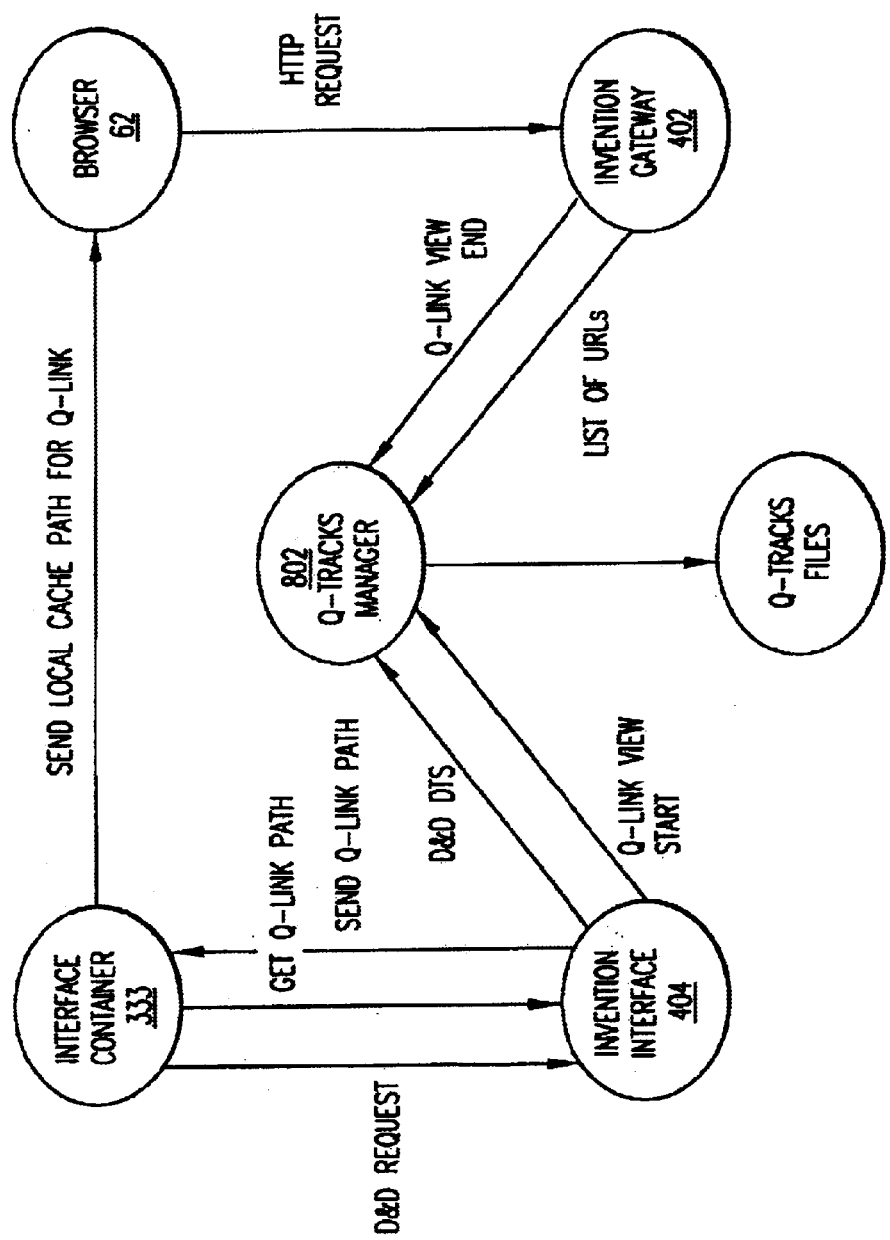
FIG. 14 shows the basic flow of operation for the Q-Tracks Manager

The Q-Tracks Manager 802 is the entity of the invention that communicates with the Invention Web Server 302 to facilitate the delivery, measurement and reporting of interaction with the Q-Link and Q-Touch pages. The gathering of this information is important so as to allow content providers to gain access to data on how users are viewing their Web pages once they have been brought down from the Requested Web Server 306 into the cache on the user's hard drive 36 (where content provider server logs are no longer capable of tracking interaction since this interaction is taking place in the remote environment on the user's computer 12). In addition, as the popularity of the invention grows, Q-Tracks data will be used to target advertising based not just on users' demographic information, but also on their surfing patterns. The basic flow of events along with relevant entities is illustrated in FIG. 14.

The Q-Tracks Manager 802 traps user-generated stimuli to produce interaction information on how the user views Q-Links pages and Q-Touch pages. The Q-Tracks Manager 802 keeps track of the following events issued by the Invention Interface 404 and the Invention Gateway 402: Drag and Drop request (Invention Interface 404); Q-Link Local Path request (Invention Interface 404); Further HTTP Request from the browser after displaying the Q-Link (Invention Gateway 402); and, Links activated from the current Q-Link displayed in the browser (Invention Gateway 402). By keeping track of the above mentioned set of events, the Q-Tracks Manager 802 collects the following information and stores them in separate Q-Tracks log files for Q-Links and Q-Touch pages: (1) Date Time Stamp of D&D'ed Q-Link; (2)Time Stamp of Q-Link/Q-Touch Page View Start; (3) Date Time Stamp of Q-Link/Q-Touch Page View End; (4) Links activated from Q-Link/Q-Touch Page (one layer only).

This information is periodically sent to the Invention Web Server 302 which analyzes the data and provides statistics to various authorized groups (such as the content providers that host the pages) via its interface, and uses the data for targeting advertising.

As described above, the invention controls the content downloaded to the user's computer by adopting a sophisticated priority schedule, and then assigning all HTTP requests with a slot in the hierarchy. The invention allocates bandwidth to the highest priority item. The priority schedule is as follows:

1. Primary download request issued by the browser 62;
2. BITE download request activated by D&D;
3. Advertising banner downloads from the Invention Web Server 302;
4. Q-Touch page download for "Q-Touch 1";
5. Q-Touch page download for "Q-Touch 2";
6. Q-Touch page download for "Q-Touch 3";
7. Q-Tracks information upload from the invention to the Invention Web Server 302.

If the invention is downloading or uploading information, and a request is made by a higher priority item to use the bandwidth, the invention stops the exchange of data and allows the higher priority item to have access to the connection. When the higher priority data exchange is completed the lower priority item resumes its data exchange.

V. Prioritization

Figure 15:
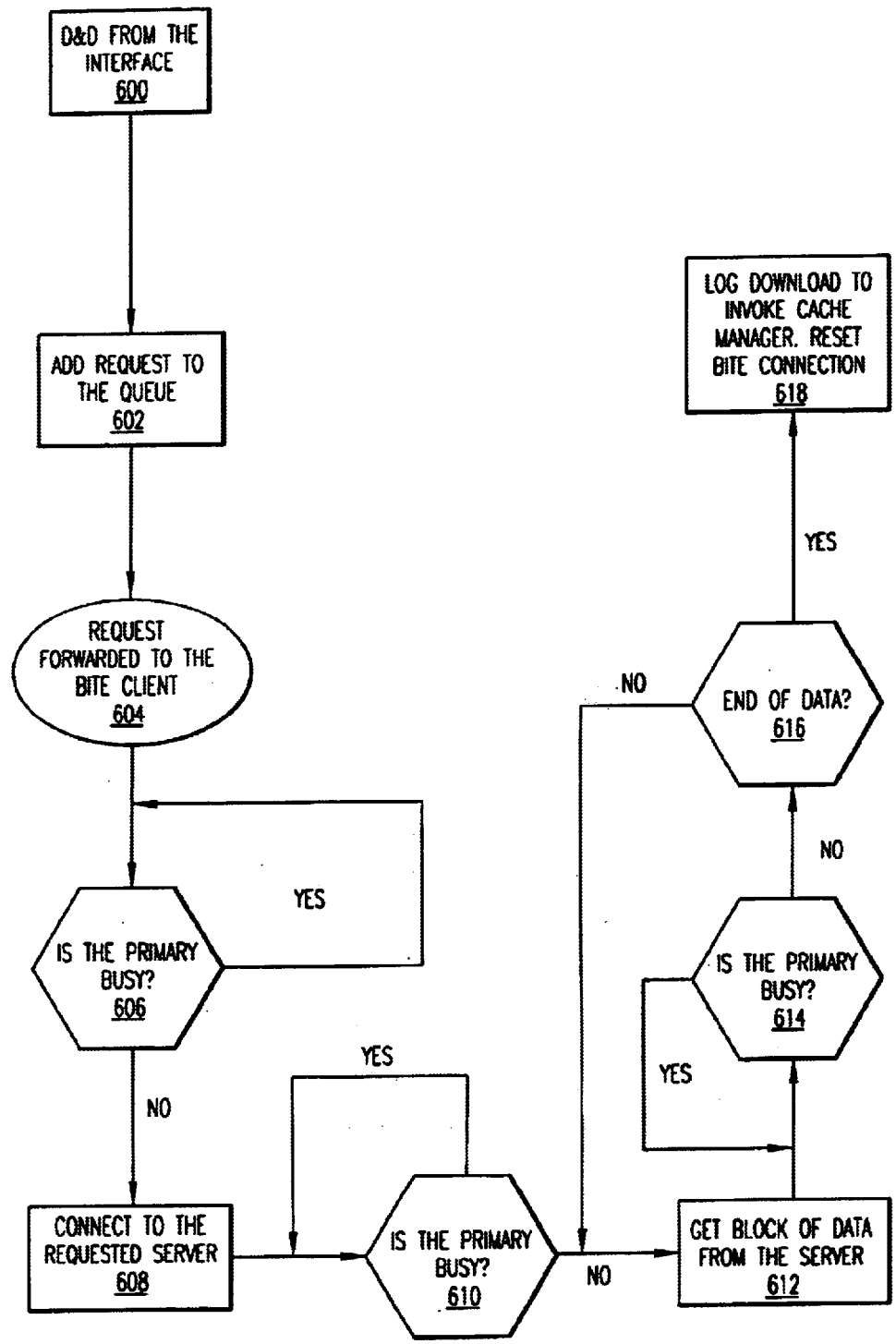
FIG. 15 is a representative flowchart diagram of the Prioritizing Process

FIG. 15 is a representative flowchart for the Prioritizing Process. When the user drags-&-drops a link (Step 600) the HTTP request is passed through the Queue Manager 406 (Step 602) to the BITE Client 408 (Step 604) and is prepared for downloading. The invention then performs a test (Step 606) to determine whether a higher priority item is using the bandwidth. If a higher priority item is using the bandwidth then the invention will loop to re-perform the test in Step 606 until the data transfer of the higher priority item is complete. When it is complete, and if in a repeat of the test in Step 606 no higher priority item is using the bandwidth, the invention establishes a secondary link between the client and the Requested Web Server (Step 608) (if a lower priority item is transferring data, then it is stopped to let the higher priority item perform a transfer. Upon completion the lower priority item will resume its transfer). Once a connection with the Requested Web Server is established, the invention performs the test at Step 610 to again check to see if an item of higher priority is in the queue. If a higher priority item does exist, the invention loops the suspended request until no other higher priority item remains. Once no other higher priority item remains, the data associated with the requested URL is then downloaded in packets (as discussed below) from the Requested Web Server 306 (Step 612). Between each packet of data, the invention performs the test at Step 614 to again check to see if an item of higher priority is in the queue. If a higher priority item does exist, the invention loops the suspended request until no other higher priority item remains. Once no other higher priority item remains, the invention continues to download the suspended data from the previously requested URL, proceeding in the same data packet manner with constant checks for higher priority items. If the invention does not receive a higher priority request in any of the tests at Step 614, then the download continues uninterrupted until completion in Step 616. Once the download of the data for the requested URL is complete, the invention passes the downloaded data to the Cache Manager 410 (Step 618) and resets the BITE connections for subsequent requests.

It should be noted that FIG. 15 is used to depict the invention's priority schedule. The diagram does not display certain elements and interactions detailed in other areas of this specification.

The HTTP request issued by the BITE Client 408 and routed through the Invention Gateway 402 fetches the hypertext document (.html file) associated with the requested URL. After the file has been fetched from the Web Server 302 or 306, the HTML Resource Parser parses the file to generate a list of resources embedded in the file. Once the resource list has been prepared by the parser, the client starts issuing further HTTP requests to the server for fetching them. The current implementation aims at parsing the html file to extract the following resources: Images in .gif format; Images in .jpg format; and, Applet classes with extension class.

The HTML Title Parser accepts the html file fetched from the server, and searches for <title>tag in the file to extract the Title information of the document. Once extracted, the URL of the document and its title will be displayed in the Q-Links list.

A Client does not check the status of the primary connection once it has issued its own URL request. Hence, any primary request made during this timeframe will be delayed for microseconds until the secondary connection for a packet of data has been established or a network error has occurred.

During the process of data transfer between the Requested Web Server 306 and the BITE Client 408, the primary connection status is checked after receiving a packet of data from the server. Any primary request made in this time frame will remain queued for microseconds until the packet has been received.

VI. Operational Modules

The operational modules associated with the BITE Client 408 are listed in Table 5 below with a description of their respective functionality and interfaces:

TABLE 5

| Name | Parameter | Description |
| --- | --- | --- |
| Public void downloadUrl-ToCache (String urlRequest) | urlRequest is the Internet address of the file which needs to be downloaded in the background and is of the form of: http://machine: Port Number/filename. | The function forms the kernel of the BITE Client 408 entity which is responsible for forwarding the HTTP request to the Invention Gateway, fetching blocks of data from the Requested Web Server, checking the status of the primary connection after every logical step, invoking the Cache Manager for data storage, updating all the appropriate log files, resetting the secondary status bit after completion of download, and then entering the "listen" mode for more HTTP requests from the Queue Manager. |
| Private String serverName (String urlRequest) | urlRequest is the Internet address of the file which needs to be downloaded in the background and is of the form of: http://machine: Port Number/filename. | The module parses the parameter to extract the server name. If the urlRequest is of the form of: http://serverName:Port number/filename, it parses the string and returns serverName. |
| Private int serverPort (String urlRequest) | urlRequest is the Internet address of the file which needs to be downloaded in the background and is of the form of: http://machine: Port Number/filename. | The module parses the parameter to extract the server port number. If the urlRequest is of the form of: http://serverName:Port number/filename, it parses the string and returns serverPort. |
| Private String serverUrl (String urlRequest) | urlRequest is the Internet address of the file which needs to be downloaded in the background and is of the form of: http://machine: Port Number/filename. | The module parses the parameter to extract the file name in the server. If the urlRequest is of the form of: http://serverName:Port number/filename, it parses the string and returns filename. |

The operational modules associated with the Cache Manager 410 are described in Table 6:

TABLE 6

| Name | Parameter | Description |
| --- | --- | --- |
| public String makeRoot-Directory (String url) | URL of the background download. Returns local path under which the contents of the URL will be stored. | The module generates a unique local cache path for the requested background download and updates a log file which stores the unique mapping between the URL and its cache path. |
| public void updateCache-Log(String path, String url, int memory) | The triplet stored in the cache log corresponding to the background download. param 1: local cache path param 2: corresponding URL param 3: Total memory consumed by the content of the URL | The module updates the cache log by appending the existing log file with the new entry corresponding to the background download. If the URL is supposed to be http://www.intel.com/index.html, the local cache path as c:\install\cache\125.46 and the total memory consumed as 54328 bytes, the log file will be appended with the entry http://www.intel.com/index.html\| c:\install\cache\125.46\|54328. |
| public int getCacheSize( ) | | The module returns the total memory consumed by the cache. | The module computes the total memory associated with all download processes other than the one initiated by the browser. |
| public int isCacheFull( ) | | Returns 1 if the cache is full, else returns 0. | This module calls the function getCacheSize( ), compares the return value with the preset Cache Storage Limit set by the user and issues alert in case the value comes within a predefined threshold. |
| public void deleteCache-LogEntry (String url, String logfilename) | parameter #1 url is the URL of the background download, parameter #2 is the name of the log file which needs to be consulted. | Once a signal is generated to delete a previously downloaded URL, this module deletes the entry in the log file corresponding to the specified URL. |
| public void deleteUrl-LocalFiles (String url) | parameter #1 url is the URL of the background download | Once a signal is generated to delete a previously downloaded URL, this module deletes all the files associated with the URL and invokes deleteCacheLogEntry(url) to delete its entry in the log file. |
| public String getUrlLocal-Path(String url) | parameter #1 url is the URL of a cached file. | This module consults the log file storing the mapping between URLs and cache file paths, and generates the Local Cache path corresponding to the URL specified as input parameter. |
| public void makeDirectory (String[] resource, int numResource, String rootPath) | parameter #1 is an array of resource files embedded in a given html file, parameter #2 is the number of elements in the array and parameter #3 is the local cache path for the html file. | After downloading the file associated with the requested URL, the file is parsed to generate a set of resource files. The BITE Client 408 then issues further HTTP requests to fetch these resource files and invokes this module to make proper directory structure to store all of them. As an example, say the file index.html associated with the URL http://www.intel.com/index.html is stored in a local cache path c:\install\cache\987.65\index.html. Assume that the html file has the resource A/prod/product.gif". Then, |

TABLE 6-continued

| Name | Parameter | Description |
|---|---|---|
| | | this module will create a directory c:\install\cache\ 987.65\prod to store the gif file. |
| Public void updateDTSFile (String url, String downloadDate, String downloadTime) | parameter #1 url is the URL of the background download, parameter #2 is the date stamp when the download has occurred and parameter #3 is the time stamp. | This module registers the date and time corresponding to a specific background download in a cache log file. |
| Public void autoCacheDeletion( ) | None. | Before the BITE Client 408 connects to the Requested Web Server, it calls the isCacheFull( ) routine to check whether the storage limit has been exceeded. If the "Cache Full" condition is detected, then this module is automatically invoked to clean up space for accomodating the new download. The cleaning up procedure is conducted in the following fashion: It finds the array of unflagged URLs from the cache log file It sorts the array of URLs based on the last view time It deletes the first n (depending on space needed) URLs from the local cache by invoking the module deleteUrlCacheFile(url) |
| Public String getUrlDateTime(String url, int dateTimeFlag) | parameter #1 url is the URL of the background download, parameter #2 is 0 for getting date and 1 for time. The return parameter is a string containing either date or time depending upon the value of the second input parameter. | This module returns either the date or the time stamp corresponding to the specified URL. |

The operational modules associated with the Queue Manager 406 are described in Table 7 below.

TABLE 7

| Name | Parameter | Description |
|---|---|---|
| public String[] readQueue (String logfilepath, String file) | parameter #1 is the path for the log file maintained by queue manager, parameter #2 is the name of the log file which needs to be consulted. The return parameter is the array of elements stored in the log file (all the D&D requests issued by the interface and queued for future services) | This module returns the array of all queued requests to the calling module. |
| public void putRequest (String url) public void putTitleData (String title) | parameter #1 url is the URL of the background download parameter #1 title of an html page. | This module is invoked by the interface for queuing a request. This module receives the title of an html document, generates a tuple of the form URL | Title and stores it in a title log file. |

TABLE 7-continued

| Name | Parameter | Description |
|---|---|---|
| public String getRequest( ) | None. | This module is invoked by the BITE Client 408 to read the top of the queue. It returns null if the queue is empty. |
| public void servedRequest( ) | None. | This module is invoked by the BITE Client 408 after completing a background download process. On activation, it removes the topmost element of the current stack. |

The operational modules associated with the Task Manager 422 are listed below in Table 8:

TABLE 8

| Name | Parameter | Description |
|---|---|---|
| int isLineFree( ) | Return parameter is 1 if line free, else 0. | If both the primary and secondary connections are idle, the module returns 1, else 0. |
| int isAdDownload( ) | 1 if ad download is possible, else 0. | This module calls isLineFree( ). If it returns 1, ad download is possible and it returns 1. Else returns 0. |
| int isStatUpload( ) | 1 if Q-Tracks information upload is possible, else 0. | This module consults the priority list for requests, returns 1 if it is possible to invoke Q-Tracks info upload, else returns 0. |
| int isSubscriberDownload( ) | 1 if Q-Touch page download is possible, else 0. | This module consults the priority list for requests, returns 1 if it is possible to invoke Q-Touch page download, else returns 0. |
| int canAdDownload( ) | 1 if ad banner download is necessary, else 0. | This module consults the ad task manager's log file for extracting DTS for last ad download, checks whether the time interval has exceeded the preset limit. Returns 1 if it is necessary to invoke Ad download, else returns 0. |
| int canStatUpload( ) | 1 if Q-Tracks upload is necessary, else 0. | This module consults the Statistics task manager's log file for extracting DTS for last statistics info upload, checks whether the time interval has exceeded the preset limit. Returns 1 if it is necessary to invoke stat. Info upload, else returns 0. |
| Int canSubscriberDownload( ) | 1 if Q-Touch site download is necessary, else 0. | This module consults the Q-Touch task manager's log file for extracting DTS for last download, checks whether the time interval has exceeded the preset limit. Returns 1 if its necessary to invoke new download, else returns 0. |
| Public void updateAdLog (Day newDay) | parameter #1 is the instance of the current day. | This module updates the ad task manager's log file with the timestamp of the new download. |
| Public void updateStatLog (Day newDay) | parameter #1 is the instance of the current day. | This module updates the stat. task manager's log file with the timestamp of the new upload. |

TABLE 8-continued

| Name | Parameter | Description |
| --- | --- | --- |
| Public void updateSubsLog (Day newDay) | parameter #1 is the instance of the current day. | This module updates the subscriber task manager's log file with the timestamp of the new download. |
| int getTime-Interval(Day startDay) | parameter #1 is the instance of the start day. | This module computes the time interval (in days) between the input parameter and the instance of the current daystamp. |

The operational modules associated with the Connection Manager 418 are shown in Table 9.

TABLE 9

| Name | Parameter | Description |
| --- | --- | --- |
| public int getLinkInfo(int linkPosition) | param #1: link status (0 for reset, 1 for set), return parameter is the link number (0 for primary, 1 for secondary, 2 for ad) | The module gets the status of the link specified by the input parameter. Returns 1 if the status is busy, else 0. |
| public void modifyLink-Info(int linkStatus, int linkPosition) | param #1: link status (0 for reset, 1 for set), param #2: link number (0 for primary, 1 for secondary, 2 for ad) | The module modifies the status of the link specified by the input parameter |
| public void setPrimaryInfo( ) | None. | Sets the primary connection status in the connection manager's log file. |
| public void resetPrimary-Info( ) | None. | Resets the primary connection status. |

The operational modules associated with the Invention Gateway 402 are the HTTP Connection and the HTTP Response.

The HTTP Connection implements http protocol requests; it contains most of HTTP/1.1 and is unconditionally compliant. Redirections are automatically handled, and authorization requests are recognized and handled via an authorization handler. Only full HTTP/1.0 and HTTP/1.1 requests are generated. HTTP/1.1, HTTP/1.0 and HTTP/0.9 responses are recognized. There are several methods for each request type; however the general forms are: Head ( file [, form-data [, headers]]; Head (file [, query [, headers]]); Get ( file [, form-data [, headers]]); Get (file [, query [, headers]]; Post (file [, data [, headers]]); Put ( file [, data [, headers ]]); Delete (file [, headers]); Options (file [, headers]); and Trace ( file [, headers]).

The HTTP Response consists of the following elements:

(1) public final int getStatusCode( ) throws IOException which gives the status code for this request. These are grouped as follows: 1xx—Informational (new in HTTP/1.1); 2xx—Success; 3xx—Redirection; 4xx—Client Error; 5xx—Server Error.

(2) public String getHeader(String hdr) throws IOException, retrieves the field for a given header: @param hdr the header name; @return the value for the header, or null if non-existent; @exception IOException if any exception occurs on the socket.

(3), public synchronized byte [ ] getData( ) throws IOException: @return an array containing the data (body) returned. If no data was returned then it is set to a zero:-length array; exception IOException If any io exception occurred while reading the data.

VII. System Log Files

The system is composed of several System Log Files. The System Configuration file contains the user's choice about the Cache Storage size, default browser configuration and other similar user options. The Cache Log file contains the list of downloaded URLs in the cache maintaining the following format: Downloaded URL | Local Cache Path | Total Memory consumed. The Cache DTS file contains the date time stamp for all the downloads in the following format: Downloaded URL | Day Stamp for download | Date Stamp for download | Last Viewed Date stamp | Last Viewed Time stamp. The Queue file contains the URLs of all the queued request. The Title file contains a list of titles corresponding to all the downloaded URLs in the following format: Downloaded URL |0 Title of the document | Status of download. The Connection Status file contains the connection status for all the HTTP Clients in the system in descending order of priority as: primary connection status | secondary connection status | ad download status | Q-Tracks info upload status | Subscriber download status | SMN download status | Co-brand download status. The Ad Status file contains the day time stamp for the last ad banner download in the following format: Day of last download | Time of last download. The Q-Tracks Status file contains the day time stamp for the last Q-Tracks info upload in the following format: Day of last download | Time of last download. The Subscriber Status file contains the day time stamp for the last subscriber's site download in the following format: Day of last download | Time of last download. The SMN Status file contains the day time stamp for the last SMN info download in the following format: Day of last download | Time of last download. The Co-Brand Status file contains the day time stamp for the last co-brand download in the following format: Day of last download | Time of last download.

The invention's user interface (Invention Interface 404) provides a container 333 (FIG. 14) onto which the user can drag-and-drop (D&D) hyperlinks from the browser. The system then downloads the page associated with the link in the background. The pages of these D&D'ed links are stored in the invention's Cache 420 on the user's hard drive, and are presented as Q-Links in a list 261 on the Invention Interface 404. The user can click on the title or address of any of these Q-Links to display it in the open instance of the browser 62. The Invention Interface 404 also has an ad display area for banner advertisements. Whenever the user clicks on the ad banner he/she is connected across the Internet, and a Web page for the corresponding advertiser is displayed in the open instance of the browser 62.

There are two files maintained by the software for Configuration Information. First, is the INI File, used by the Interface Container 333. Second, is the Preferences File used by the Invention Interface 404.

The Interface Container 333 is responsible for reading the configuration information from the INI File, and also changing any entry in the INI File and Preferences File whenever there is any change in the system configuration of the invention. The Invention Interface 404 reads the current configurations from the Preferences File.

The following information is kept in the INI file: an SMN logo URL; About smQ URL, Search button/Licensee Web site URL; Q-Touch Page #1; Q-Touch Page #2; Q-Touch Page #3, default URL; Storage preferences/cache size; Default Browser, Internet Explorer/Netscape; MultiLink option (YES/NO), for drag and drop of the Image maps :default is YES; Cue Cards (ON/OFF), default is ON; and, User ID.

The following information is kept in the Preferences File maintained by the Invention Interface 404 are: Cache size; Q-Touch Page #1; Q-Touch Page #2; Q-Touch Page #3; About smQ URL; Search/Marketing Partner URL; Help URL; User ID.

The Configuration Manager is responsible for maintaining the configurations of the system. The configurations are written in the INI File. It is read by the Configuration Manager from this INI File when the system starts. In the event of a change in the configuration (by the user), the Configuration Manager writes the changed configuration to the INI File. It also writes the configurations to a "Preferences" File maintained by the Invention Interface 404 at the start of the session, and when there is a change in configuration.

The Configuration Manager reads the original configuration from the INI file at the beginning. It also writes the configuration in the "Preferences" file maintained by the Invention Interface 404. The Configuration Manager changes the configuration based on user input. The Configuration Manager writes the changed configuration into the INI file. It also writes the changed configuration to the "Preferences" file maintained by the Invention Interface 404.

The operational modules of the Configuration Manager are described below:

Public char* readFromINI(char* pszIndex) module reads the configuration information from the INI File. It has the following Parameter: pszIndex: pointer to the Index in the INI file, whose value is to be read. Its return is the value of the Index read from the INI File.

Public void writeToPreference ( ) module writes the following configuration information to the Preference File: cache size; Q-Touch Page #1; Q-Touch Page #2; Q-Touch Page #3; About smQ URL; Search/Marketing Partner URL; Help URL; and, User ID.

Public void writeToINI (char* pszIndex ) module writes to the INI File. It has the following parameters: pszIndex: Index of the INI File to change.

Public Set/Get functions module sets and gets different configuration information.

VIII. Program Activation

In order to drag-&-drop hyperlinks from the browser 62 to initiate a background download, the invention is activated by the user in a fashion similar to activating other computer programs. This is determined by the operating system, thus, under Windows the user would left click 75 twice in rapid succession (commonly referred to as "double-click") on the icon of the program. The invention checks whether an instance of the browser 62 is already existing at the point of invocation and if it fails to detect its presence, it automatically launches an instance of that browser specified by the user through "Browser Choice" selection during registration. In addition to the standard activation procedure, the user may activate the invention by double-clicking on the icon of their Web browser, which implicitly activates the invention upon invocation of the browser. This ensures that the Invention Interface 404 is always ready to received D&D hyperlinks from the browser, and also ensures maximum viewership for the advertising in the Invention Interface 404. The implementation of this so-called Bi-Directional Launching mechanism requires the existence of a separate module called QListener, which is activated once the user turns on his/her computer. QListener exists as a background process running at all times, and its deactivation can only be accomplished by uninstalling the entire invention from the hard drive, and restarting the system. In order to provide Bi-Directional Launching, the QListener module interacts with both the invention and the browser 62. The QListener is invoked at the time of system boot. Upon its activation, it checks for the presence of a browser in the system by conducted a search through all the active applications. This search is repeatedly conducted at a polling interval that it does not put additional load on system resources (every 10 seconds). If it detects the presence of a browser in the system, it checks for the existence of the invention. If the invention is active at that point, it goes back to its "polling" mode. If the invention is not active at the point, it invokes an instance of the invention by activating the corresponding executable. QListener then returns to "polling" mode. If the user invokes additional instances of browser, the module limits the number of active instances of the invention to one. If the module detects no browser in the system but does detect an instance of the invention (which happens only in rare circumstances), it deactivates the current instance of the invention and returns to "polling" mode. The activation of the invention by double-clicking on the corresponding icon, however, is not handled by or affected by the QListener module. The polling duration of the QListener module has been preset to ten seconds. The significance of the chosen interval can be explained by observing the average delay between activation of the browser and subsequent display of the default web page. It has been noted that this delay is close to the aforementioned duration for a machine with standard configuration, ensuring that smQ is launched (in case it did not exist previously) before the user can initiate his/her browsing session. The mechanism employed by QListener to detect the presence of browser is as follows: It investigates the list of active processes (as presented by the Task manager for a Windows 95/NT system) and searches for such applications entitled "Microsoft Internet Explorer" and/or "Netscape." The module reverts back to the default "polling" state if it finds no applications of those names. If applications of those names are found, the detection is followed by initiation of the invention. It has been experimentally deduced that the additional system load generated by the 10-second polling of the QListener module is less than 1%, both in terms of CPU and memory consumption, and would not be noticed by the user. The QListener module described above solves the problem of not loading the system with such a system memory and CPU-intensive application as the invention. QListener is a tiny program, which will eventually invoke the entire application of the invention upon receipt of appropriate stimulus in the form of browser activation. Based on the methodology of the above design, the flow of events for Bi-Directional Launching can be categorically listed as: Load the QListener module on system boot; QListener continues to exist till the next reboot, and polls the status of browser; QListener is designed such that the polling exercise does not weigh down the system i.e., it should not slow down other running applications or make the user aware of its existence; The polling duration should be ascertained such that the Invention Interface 404 becomes visible within the start-up activity of the browser; To minimize additional load, QListener only monitors the "title" field of all the running applications; Once such a browser application is detected, QListener launches invention application; If the user invokes a second browser, QListener will detect the presence of a running instance of the invention, and will not launch a second instance; The invention will be closed once the browsing session is terminated by the user; QListener will remain in the polling state, looking for initiation of a subsequent browsing session; The standard activation of the invention by double-clicking on its icon remains is unaffected by bi-directional launching; The QListener application is invisible both in the Task Bar and in System Tray, but its presence can be detected from the Task Manager by pressing Ctrl-Alt-Del; If the user terminates QListener by eliminating it from the Task Manager, it will be activated again the next time the computer is turned on; If the user terminates QListener while the invention is active, Q-Listener will reactivate itself in the same session; If the user removes QListener in a given session, the only way to activate the invention is by double-clicking on the icon of the invention.

IX. Drag-&-Drop Operations

Figure 16A:
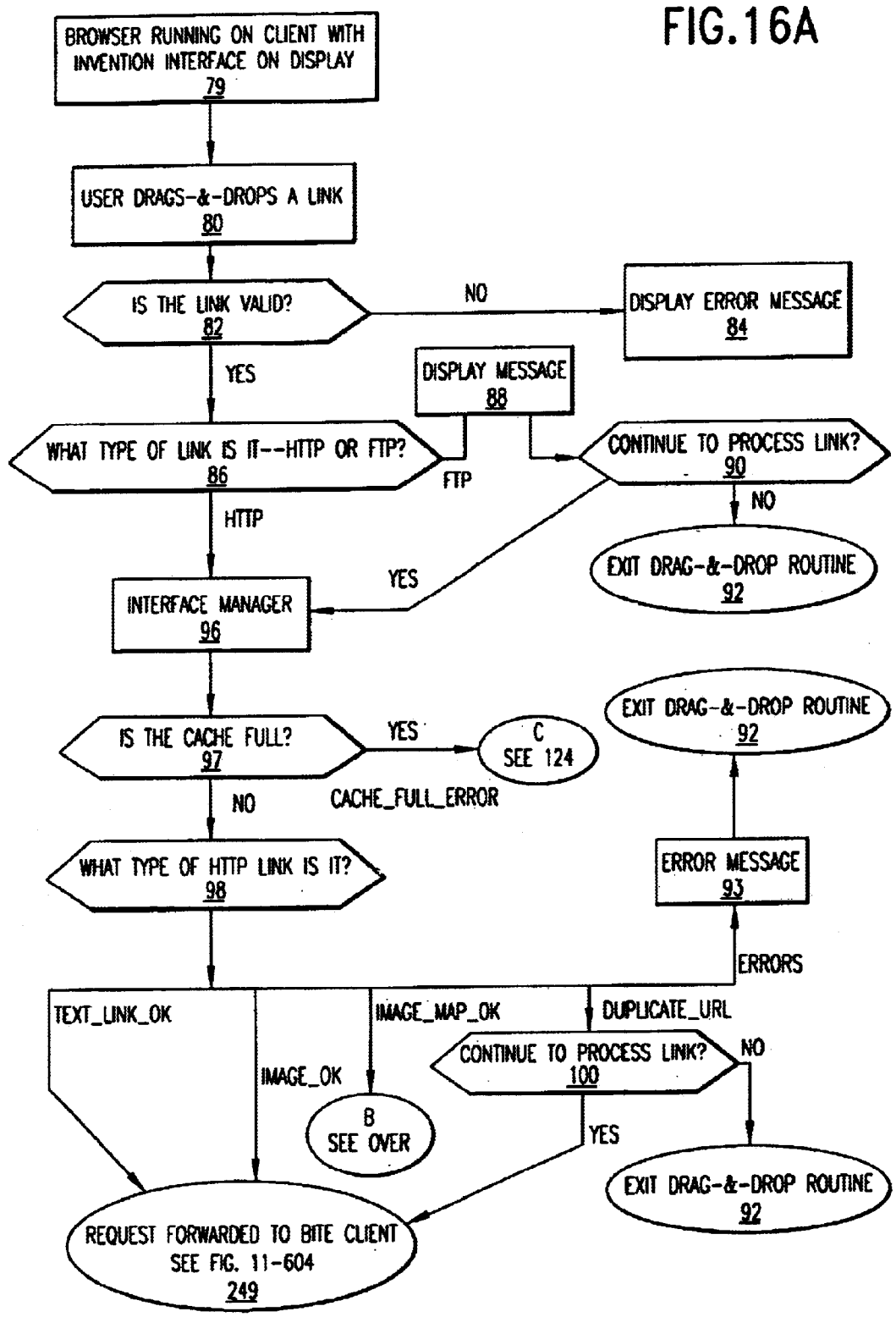
FIG. 16 is a flowchart diagram for the drag and drop of links.
Figure 16B:
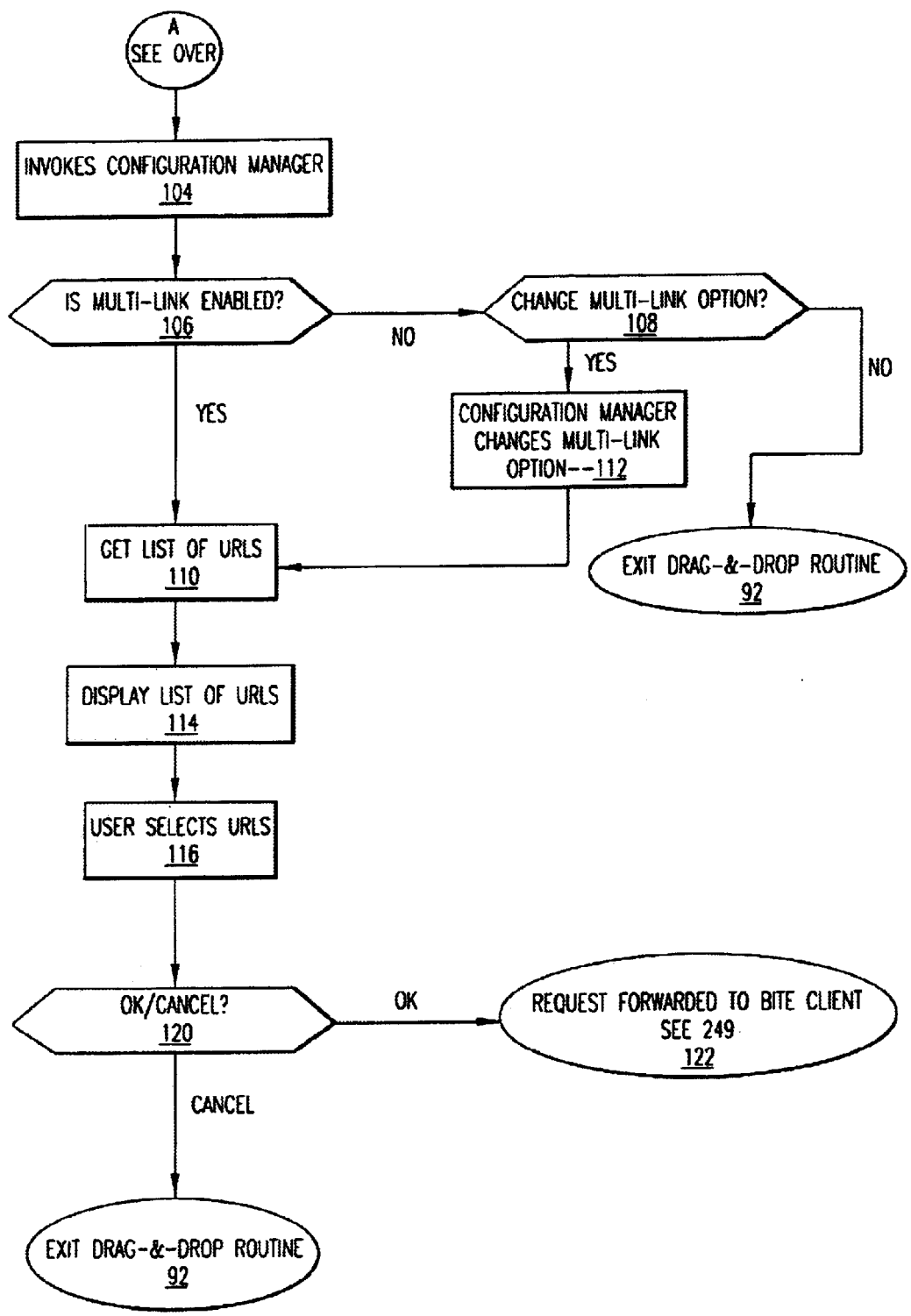

The flowchart in FIG. 16 illustrates the Drag-&-Drop operations of the invention. The method begins at step 79 as a current Web page is being displayed on the browser 62 and the Invention Interface 404 "floats" above the window of the browser 62 (see FIG. 6). It is assumed that this Web page has embedded therein one or more links, each of which are associated with a different Web page. In step 80, the user clicks and holds the left mouse button 75 (FIG. 3) (or equivalent single click and hold left mouse function process on their pointing device) on the link he/she wishes to view in the future. The user drags the link on to the Invention Interface 404 and then releases the left mouse button 75 (or the equivalent). At step 82, a test is made to determine whether the link is valid. If it is not valid, an error message is displayed to the user at step 84. If the link is valid, the method continues at step 86 where the invention determines the type of link which has been selected. If the link is associated with the file transfer protocol (ftp link) then at step 88 the invention displays the user a message advising that the link is a large ftp link which is best not downloaded using the invention. The user is prompted at step 90 to continue or to exit the drag and drop routine. If the user decides that he/she does not want to download this ftp link, then the invention disregards the link and exits the drag-and-drop routine 92. If the user decides that he/she still wishes to download this ftp link, then the invention continues to step 96. If the link in step 86 is either an http link, then the invention continues to step 96. The invention then performs a test in Step 97 to determine if the cache is full.

Figure 17:
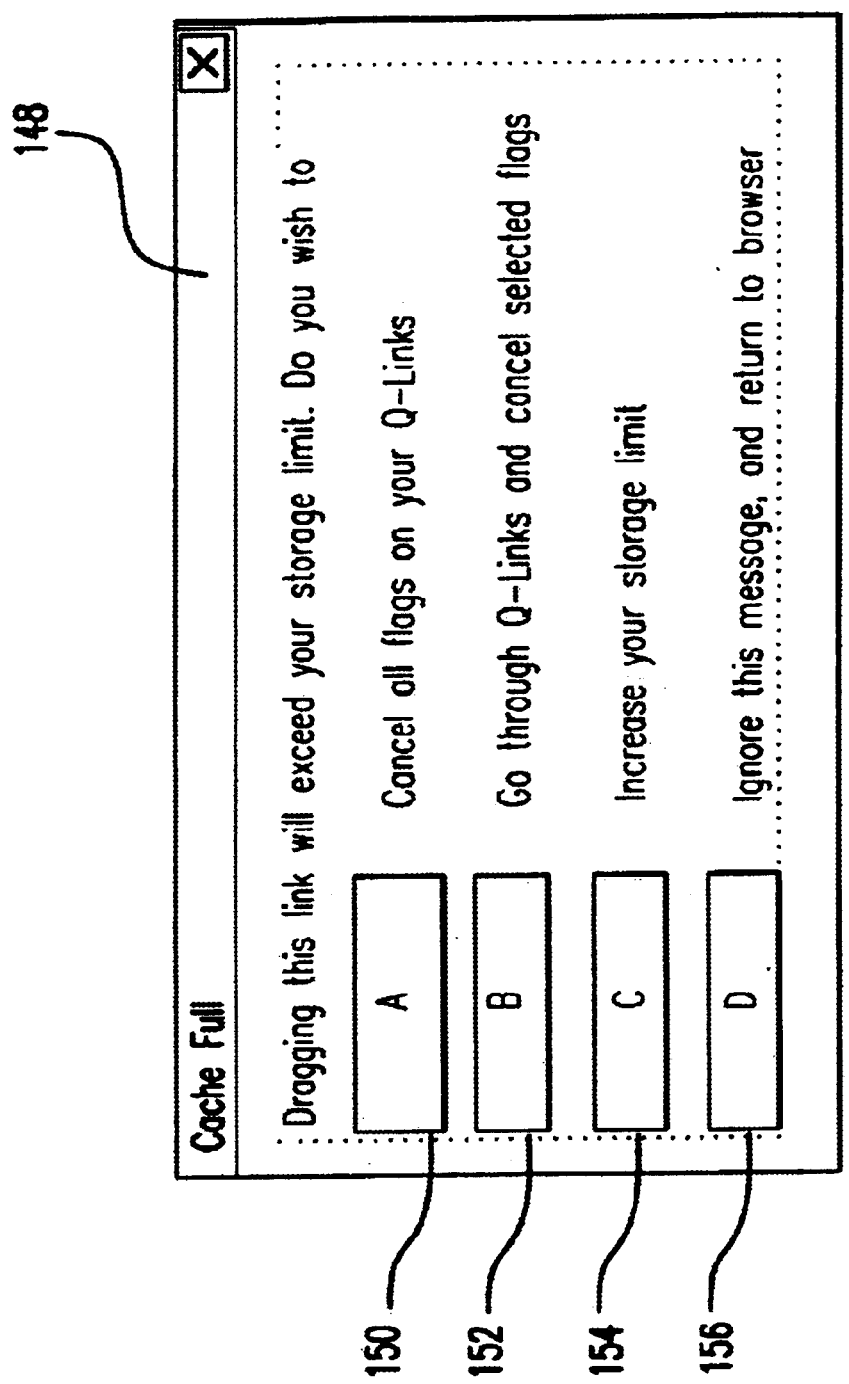
FIG. 17 shows a dialog box giving "Cache Full" options.
Figure 18:
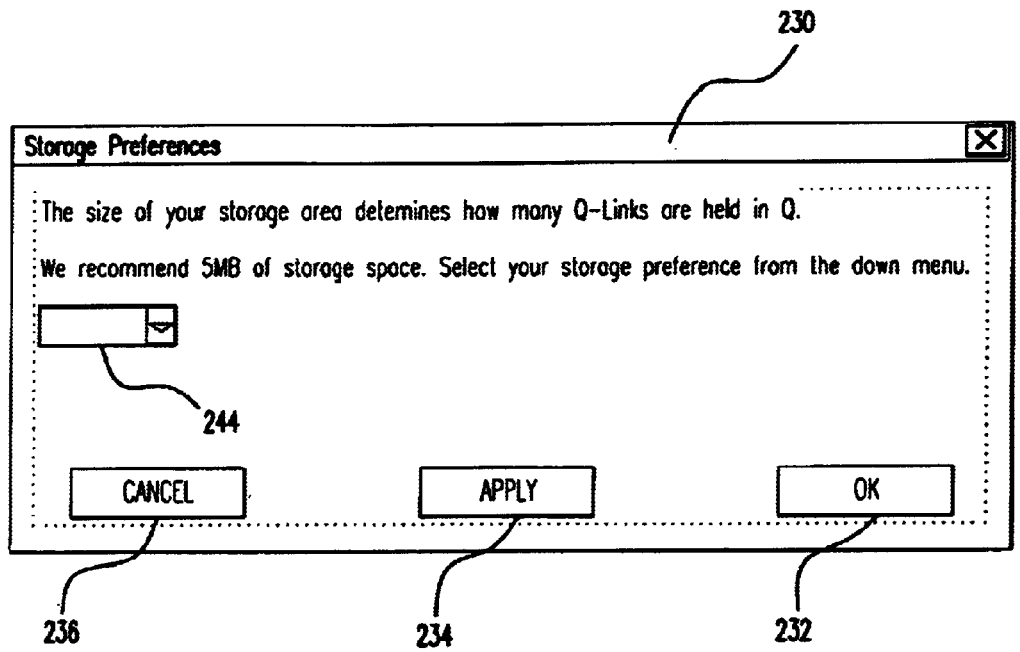
FIG. 18 shows a dialog box giving Storage Preference options.

If the test in step 97 determines that the cache is full, then the invention, in step 124, displays the option list 148 as displayed in FIG. 17. The invention determines that the cache is full if the cache residue falls below a predetermined threshold. If it is necessary to make room for new Web pages, the invention will automatically delete links and Web pages in the order of the oldest link and associated Web page, to the newest link and associated Web page (FIFO). The cache can be full if the user "flagged" Q-Links, as described in detail below, so that the invention will not automatically erase old Q-Links to make room for new Q-Links and there is not sufficient room to download the newly selected Q-Links. The user then selects what he/she would like to do, as shown in step 126. If the User selects "A" 150, the invention invokes the Q-Links Manager 128 to "unflag" all Q-Links and the invention deletes cached Q-Links by date to make room for the newly selected Q-Links. The invention then, at step 134, returns to the main in flow to perform the http link type test at step 98. If the user, at step 126, selects "B" 152 the invention invokes the Q-Links Manager, at step 130, to display the maximized graphical user interface 251 containing the Q-Links list 261. As discussed below, the user can then select which cached Q-Links to delete. The invention deletes the cached Q-Links and continues to the http link type test at 96. If the user at step 126, selects "C" 154, the invention invokes the Configuration Manager to display, at step 132, the storage preferences message depicted in 230, as depicted in FIG. 18. The user is given the option of changing the cache storage space in the drop down list 244. In step 131, the user is given the option of how many megabytes (MB) of storage space to choose from the drop down list. The user then can select "CANCEL" 236 which closes the display without making any changes to the storage preferences, and returns to step 124. If the user selects "APPLY" 234, the invention makes the change but keeps the storage preferences dialog box 230 open, and awaits further input from the user. If the user selects "OK" 232, the invention makes the change selected from the drop down list, closes the dialog box 230, and returns to the Interface Manager http link type test at step 98. Finally, if the user selects "D" 156 in step 126, the invention exits this sub-routine and returns to the maximized invention interface 251 or the minimized invention interface 245.

The invention then performs the test in step 98 to decide on the type of http link. If the link is a text link or an image link, then, at step 249, the link is forwarded to the BITE client for background downloading (see FIG. 15, step 604). For the D&D of text links, the Invention Interface 404 receives the URL information without the need for additional computation. The scenario is not the same for image links, as the Invention Interface 404 only receives the "image name" and not the implicit URL behind the image. The image D&D recognition mechanism of the invention addresses the problem of URL detection from the image, enabling the system to handle all kinds of D&D requests from the browser. Initially the design for URL recognition for image D&D is limited to Microsoft Internet Explorer (MSIE) browsers, although this functionality will be extended to other browser platforms as technology matures. The caching mechanism for MSIE involves the usage of four cache directories, labeled from cache1 through cache4, under c:\windows\temporary internet files\. Under each of the four cache directories, there are two Log files, MM256.DAT and MM2048.DAT. The log files contain the mapping between the resources stored in the browser cache and their corresponding URLs. The invention has been designed to read the contents of these files. Every entry is located at a fixed offset, and can be extracted in text form, however the application is not allowed to edit the file when MSIE is in active state. Whenever the user D&D's an image link from the browser, the Invention Interface 404 cannot immediately receive the URL behind the image. Instead, it passes the pathname of the gif file in the cache, e.g. c:\windows\temporary internet files\cache2\xyz.gif. The user can D&D images onto the Invention Interface 404 under two situations: (1) when the page displayed in the browser has been fetched over a primary connection, and (2) when the page displayed in the browser has been fetched from the invention's Cache 420 upon activation of one of the Q links. Under condition (1), the information passed on to the interface points to the local path of the image in browser's cache. On the other hand, under condition (2), the information passed on to the interface points to the local cache path maintained by the invention. For (2), the application can detect the source of the gif file in the following fashion: The pathname will essentially contain the installation path of the invention, which would be substantially different from that of browser's cache path. The invention stores the URL in cache by assigning it a unique ID (in the form of xxx.yyy). All the files kept under the directory will have the structure Installation Path\classes\cache\xxx.yyy\. By trivial manipulation, the application can get an idea about the local path for the html file, essentially by extracting the unique ID from the pathname of the image dropped. However, the parsing task is more difficult under scenario (1) when the html file had been fetched over the network as a primary connection by the browser, and not as a secondary request by BITE. From the pathname of the image dropped, the application can extract the cache path for the image resource. In the earlier example, it is obvious that xyz.gif resides in the browser's cache under directory cache2. Through the mapping mechanism, the application can get an idea about the URL of the image resource by scanning through the entries of MM256/2048.DAT. As an example, we will use the image resource URL <http://www.smQ.con/smn/xyz.gif>. The invention can draw the conclusion that the html file under consideration has been fetched from the site http://www.smQ.com. The search process now gets narrowed down to the domain of all html files downloaded from the above-mentioned site. The search criteria now looks like: (a)Scan the MM256.DAT under cache1 through cache4. (b)Is the entry a text file? (c)If the answer to (b) is yes, does it belong to www.smQ.com? (d)If the answer to (c) is yes, does it contain the image name xyz.gif? (e) If the answer to (d) is yes, then that is the end of the search. The html file is now parsed to find out the URL behind the image name. The recognized URL behind the image has been detected If this event flow breaks down at any point, then the user is displayed a message saying that the invention is unable to recognize the particular object D&D'ed.

Figure 19:
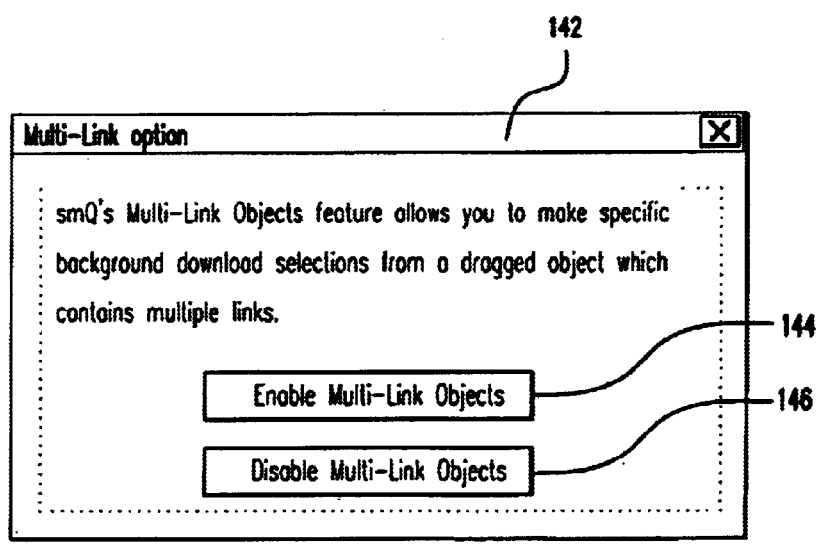
FIG. 19 shows a dialog box giving users the Multi-Link Option.

If the result of the test in step 98 is an image map (i.e. a graphical object containing more than one URL), then the Configuration Manager is initiated in step 104. A test is performed, at step 106, to determine if the invention's MultiLink Option is activated. The MultiLink Option allows the invention to display a listing of all URLs associated with an image map. If the test in step 106 for the MultiLink Option is "No," then the user is prompted to change the MultiLink Option at step 108 with the MultiLink Objects dialog box similar to that displayed in FIG. 19. If the user decides not to change the option, he/she selects the appropriate button 146, and the invention exits the D&D routine at 92. If the User wants to change the MultiLink Option, then the user selects the appropriate button 144 and the Configuration Manager changes the option in step 112 and the invention continues to step 110. If the test performed in step 106 is "Yes," or if the user selects to change the MultiLink Option in step 112, then the invention requests, in step 110, the list of URLs associated with the image map. The interface then displays the list of URLs in step 114. The user then selects the URLs he/she wants for background downloading in step 116. After selecting the URLs in step 116 the user, in step 120, selects either "OK" or "CANCEL." If the user selects "CANCEL," then the invention exits the D&D routine 92. If the user selects "OK" in step 120, the requested links are forwarded, in step 122 to the BITE client for background downloading (see 249).

If the result of the test in step 98 is a Duplicate URL, then the user is displayed a prompt asking whether he/she wants the link to be downloaded again. If the user does want the Link downloaded again, then he/she selects the "YES" and the link is then forwarded, in step 249 to the BITE client for background downloading. If the user does not want to download the link again then he/she selects the "NO", and the invention then exits the D&D routine 92. If any other errors occur within D&D flow process, the system displays appropriate error messages 93, and the program will exit the drag and drop routine 92.

The functionalities of the Drag and Drop Manager are to accept valid hyperlinks. Valid hyperlinks are text links, image links, image maps, and ftp text links. The Drag and Drop Manager passes the hyperlink to the Interface Manager 96, and the Interface Manager 96 returns the status. The return status can be: IMAGE_OK; IMAGEMAP_OK; TEXT_LINK_OK; DUPLICATE_URL; IMAGEMAP_ERROR; IMAGE_ERROR; TEXT_LINK_ERROR; CACHE_FULL_ERROR; If status=IMAGE_MAP_OK, the Interface Manager 96 checks the Multi-Link option. If this option is set or changed by the user to set it, then the Interface Manager 96 gets the list of URLs for the image map. The user selects url/URLs from this list of URLs and the Interface Manager 96 passes these URLs to the Engine. If status=DUPLICATE_URL, the Interface Manager 96 checks whether user wants to overwrite it. The Interface Manager 96 informs the Interface Manager of the Engine about the option ( yes/no).

The operational modules of the Drag and Drop Manager are listed in Table 10:

TABLE 10

| Name | Description | Parameter | Returns |
|---|---|---|---|
| public static BOOL is ValidHyplink ( char* pszHyplink) | static function that validates a hyperlink accepted by Drag and Drop | pszHyplink: url of the Hyperlink accepted. | TRUE (Valid) FALSE (Invalid) |
| public void setHyplink ( char * pszHyplink) | Sets the url of the valid link | pszHyplink: url of the valid link | |
| public char* getHyplink ( ) | Gets the url of the valid link | url of the valid link | |
| public STATUS passHyplinkToEng ( ) | passes the url of the link to the Interface Manager of the Engine. | | STATUS, this is the value returned by the Engine, on passing the url. STATUS can be of the following types: IMAGE_OK IMAGEMAP_OK TEXT_LINK_OK DUPLICATE_URL IMAGEMAP_ERROR IMAGE_ERROR TEXT_LINK_ERROR CACHE_FULL_ERROR |
| public char** getMapUrlArray ( ) | Gets the list of URLs associated with the image map | | array of strings containing the URLs. |

X. Q-Links

Figure 16C:
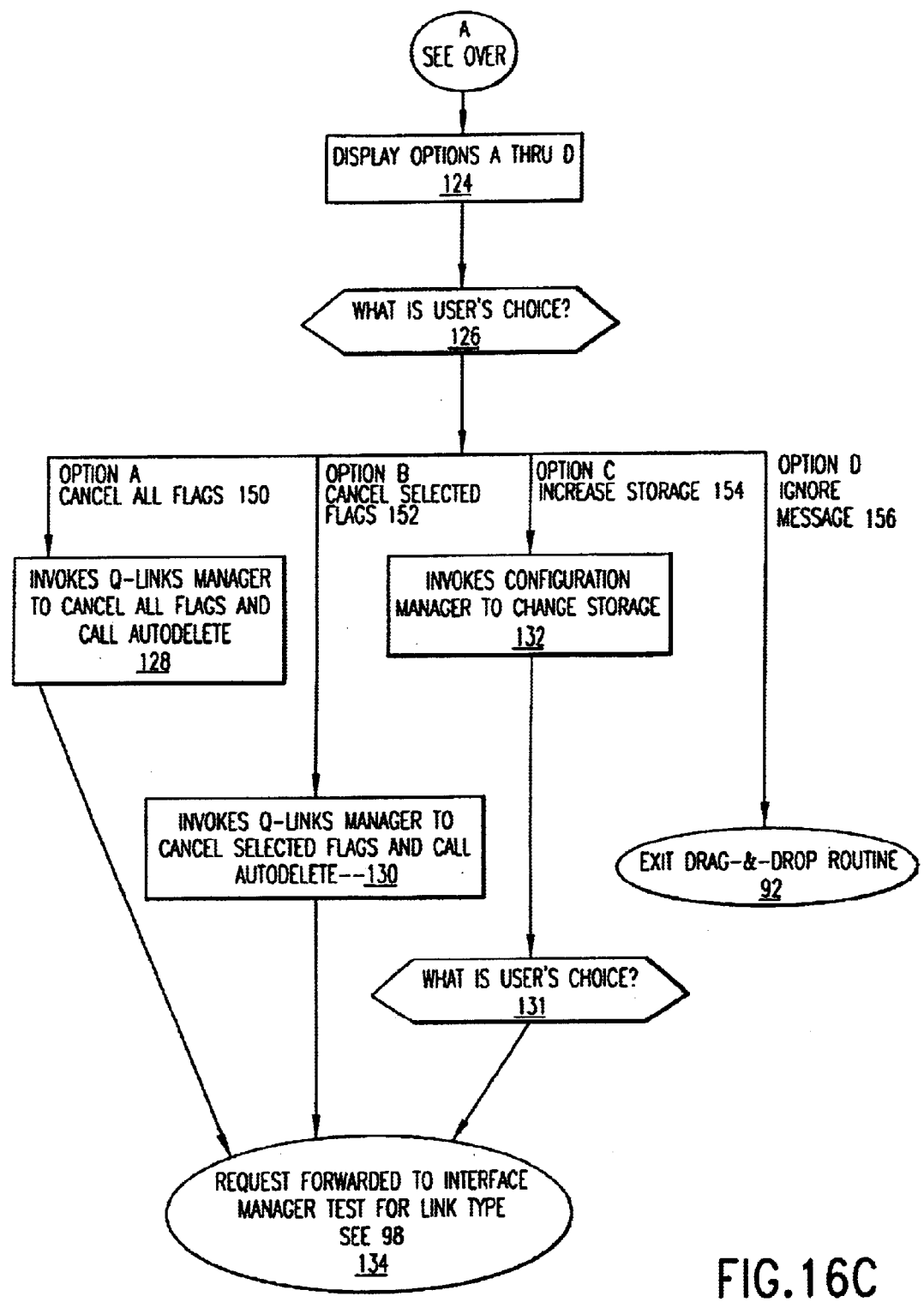

The Q-Links Manager is a sub-module within the Invention Interface 404 (see 128 and 130 in FIG. 16(C)) responsible for displaying the current list of Q-Links along with their status information in the Invention Interface 404. It also interacts with the user to get Flag/Unflag commands and Manual/Auto Delete information of the Q-Links, and sends these commands to the Invention Interface 404.

The Q-Links list display 261 is depicted in FIG. 8. When the user opens the maximized graphical user interface (GUI)

251, this invokes the Q-Links Manager, as depicted in the flowchart FIG. 20 at 164. In step 166, the invention obtains the Q-Links list and displays it on the maximized GUI 251 in step 168. The Q-Links list display 261 shows the status of the user's download requests. The invention tests, in step 169, the status of each of the Q-Links on the Q-Link list. The invention will display a red box under the "Status" column, as depicted as 263, if the result of the test is that the link that was selected by the user to be downloaded has not yet begun. The invention will display an amber box under the "Status" column, as depicted as 265, if the result of the test is that the link that was selected is currently being downloaded, and, at that moment, only the text of the Web page (which arrives into the user's hard disk cache prior to the graphics) is available to be displayed. The invention will display a black box under the "Status" column, as depicted as 264, if the result of the test is that the link was lost during transmission, was timed out due to network congestion, or a downloading error occurred. The invention will display a green box under the "Status" column, as depicted as 262, if the result of the test is that both the text and the graphics of the link have been completely downloaded and the page is available for full multimedia viewing from the invention's hard disk cache. The invention will display a gray box under the "Status" column, as depicted as 267, if the result of the test is that the link has been completely downloaded and has been viewed by the user. The invention will display a check, an X, or other marking inside of a box in the "Status" column, as depicted in 260, if the result of the test is that the user has "flagged" this page so as not to be automatically deleted by the invention when the cache capacity is exceeded. The invention will display a link in red text, as depicted in 1060, if the result of the test is that the link is associated with one of the Q-Touch pages, and this page has been updated since the last viewing by the user. Every nineteen seconds the invention performs the test in step 167 to update the Status column.

As depicted in step 170, the invention awaits input from the user. If the user left clicks (or equivalent), on the link name or Web address of the Q-Link which appears in the Q-Links display list 261 that he/she wishes to view in the browser 62, the invention returns with that page from the invention's hard disk Cache 420 and then performs a test at step 171 to determine the download status of the requested Q-Link. If the download has not yet begun (i.e. red status), the invention connects the user to the address of the requested page across the network as a primary link 172, and displays the Q-Link in the browser 173 following the standard wait interval for downloading a page from across the network (i.e. transmission will not be accelerated in any way). If only text is available (i.e. amber status), then only the text of the page is displayed 174. Following the display of this text, if the user left clicks (or equivalent) on the link in the interface again 175, or left clicks (or equivalent) on the Reload/Refresh icon on the browser menu 71 whilst simultaneously depressed the "SHIFT" key on the keyboard 22 (as depicted at step 176), the invention will perform another test to re-check the download status of this link 177. If this link's graphics have still not completed downloading in the background (i.e. still amber status), then the text-only display of the page will remain in the browser 62. If the all of the link's multimedia resources have completed background downloading (i.e. green status), the invention will display the full multimedia Q-Link page in the browser for viewing 178. If, upon completion of the test at step 171, the link's full multimedia resources have completed downloading (i.e. green status), the invention will display the full multimedia Q-Link page in the browser for viewing 178.

If while the invention in Step 170 is waiting for input, the user left clicks (or equivalent) 180 on a green status box, as depicted in 262, or a gray status box, as depicted as 267, the invention performs the test as shown in step 182. If the box was "Flagged," as in 182, then the invention resets the flag in step 184. If the box was not "Flagged," then the invention sets a flag in step 186. A user would decide to "flag" a link if the he/she does not want the invention to automatically delete the link and associated Web page from the invention's cache when the storage limit of the cache is reached. Unflagging a link allows the invention to delete the link and associated Web page from cache to make room for new Q-Links.

If, while the invention in step 170 is waiting for input, the user right clicks (or equivalent) on any color status box 188, the invention, in step 190 prompts the user to confirm whether the he/she wants to delete the selected link from invention's hard disk cache. If the User selects "NO," then the invention exits the manual delete routine 193. If the user selects "YES," then the invention at step 192, deletes the selected Q-Link from the user's cache, and exits the manual delete routine.

The properties of each Q-Link are: Link Name; Web Address; Status of Download; Flagged/not Flagged; and, is/is not Q-Touch page.

The operational modules of the Q-Links are described in Table 11.

TABLE 11

| Name | Description | Parameter | Returns |
| --- | --- | --- | --- |
| public void setLinkName( char* pszLinkName ) | sets the Link Name | pszLinkName: Name of the link | |
| public void setWebAddress (char* pszWebAddress ) | sets the Web Address | pszWebAddress: Web Address of the link ( url ) | |
| public void setStatusOfDownload ( STATUS statusOfDownload ) | sets the status of download | statusOfDownload: Download Status | |
| public void setFlag ( ) | Sets the flag. | | |
| public void resetFlag ( ) | Resets the flag. | | |

TABLE 11-continued

| Name | Description | Parameter | Returns |
|---|---|---|---|
| public void setAsSubscrpSite( ) | The Q-Link is a Q-Touch Page. | | |
| public char* getLinkName ( ) | gets the Link Name of the Q-Link | | Link Name |
| public char* getWebAddress ( ) | Gets the Web Address | | Web Address of the Q-Link. |
| public STATUS getStatusOfDownload ( ) | get the status of download | | STATUS |
| public BOOL isFlagSet ( ) | Gets the condition of the flag. | | TRUE if The flag is enabled. FALSE if The flag is disabled. |
| public BOOL isSubscriptionSite ( ) | Whether the Q-Link is a Q-Touch page. | | TRUE if The Q-Link is a Q-Touch page. FALSE if The Q-Link is not a Q-Touch page. |

The Q-Links Manager within the Invention Interface 404 is responsible for retrieving the current list of Q-Links from the Engine along with their status information. It displays the list in the Invention Interface 404, whenever the invention GUI is maximized. It is also responsible for displaying the Q-Links selected by the user for viewing in the open instance of the browser. It maintains the deletion information of each Q-Link, i.e. whether a Q-Link is flagged/unflagged, or selected for manual deletion, it sends the appropriate commands to the Engine. The functional components of the Q-Links Manager are: Q-Links List Display Manager; Q-Links Show Manager; Q-Links Deletion Manager.

The Q-Links Manager contains the list of Q-Links that are dragged and dropped by the user and still not deleted, along with their status of download, their title, web address, Flagged/not Flagged status, and Q-Touch Page/not a Q-Touch Page information. The Q-Links Manager contains the list of Q-Links. The Q-Links Manager gets the list of Q-Links from the Invention Interface 404. The Q-Link Manager refreshes the list of Q-Links from the Invention Interface 404.

The Q-Links List Display Manager reads the list of Q-Links from the Invention Interface 404 and displays all elements of the list in a list box. The Q-Links List Display Manager displays the Q-Link List in the Invention Interface 404. Q-Links List 261 in the Invention Interface 404 contains the following information for each Q-Link: Status; Link Name; Web Address.

When a Q-Link is selected by the user from the Q-Links List by left clicking (or equivalent) on either the LINK NAME or WEB ADDRESS column of a Q-Link, the Q-Link Show Manager is responsible for showing the selected Q-Link in the open instance of the browser. The Q-Links Show Manager gets the URL of the selected Q-Link and checks the status of the selected Q-Link. If the selected Q-Link has already been downloaded, the Q-Links Show Manager gets the cache local path for the selected Q-Link from the Cache Manager 410. The Q-Link Show Manager displays the selected Q-Link, from the Cache 420 into the open instance of the browser 62.

The status of the Q-Link can be of the following type: waiting to commence downloading; begins to be downloaded; incomplete drag and drop; downloaded and not viewed; downloaded and viewed.

The Q-Link Deletion Manager keeps track of the deletion information of each Q-Link in the list, and calls the manual or auto deletion function of the Invention Interface 404 for clearing the cache. It also calls the appropriate functions of the Invention Interface 404 to set/reset the flag information of each Q-Link. The Q-Link Deletion Information Manager performs the following functions: flags/unflags a Q-Link and sends the Flag information to the Invention Interface 404. The Q-Link Deletion Information Manager calls the manual mode of Q-Link deletion to the Invention Interface 404 to manually delete the Q-Link if a Q-Link is selected for manual deletion. The Q-Link Deletion Information Manager also calls the auto deletion method for the Q-Links.

The operational modules of the Q-Links Manager are shown in Table 12.

TABLE 12

| Name | Description | Parameter | Return |
|---|---|---|---|
| public void getPIWList ( ) | get the List of Q-Links from the Interface Manager of the Engine. | | |
| public void refreshPIWList ( ) | refresh the Q-Links List form the Interface Manager of the Engine | | |
| public void displayPIWList ( ) | display the list of Q-Link in the Invention Interface. | | |
| public void setSelectedPIW ( int iSelectedPIWno ) | set the Q-Link that is selected by the user to display | iSelectedPIWno: item number of the selected Q-Link in the list. | |
| public STATUS getStatusofSelectedPIW ( ) | get the STATUS of download of the selected Q-Link. The status of the Q-Link can be of the types described before. | | Status of the Q-Link |
| public void displaySelectedPIW ( ) | display the selected Q-Link in the open instance of the browser. | | |
| public void toggleFlag ( int iSelectedPIWno ) | toggle the flag that is selected by the user to flag / unflag. | iSelectedPIWno item number of the selected Q-Link in the list. | |

TABLE 12-continued

| Name | Description | Parameter | Return |
|---|---|---|---|
| public void cancelAllUrlFlags( ) | cancel the flags of all Q-Links in the current list. It also informs the Engine to cancel all flags. | | |
| public void manualUrlDelete ( int iSelectedPIWno ) | asks the Engine to delete the URL that is selected for manual deletion. | iSelectedPIWno item number of the Q-Link selected, in the list. | |
| public void autoUrlDelete ( ) | asks the Engine to perform auto deletion | | |

XI. Options

The Option Control Manager is the module of the invention which controls the actual buttons and icons that users interact with to control the functionality of the invention.

Figure 21:
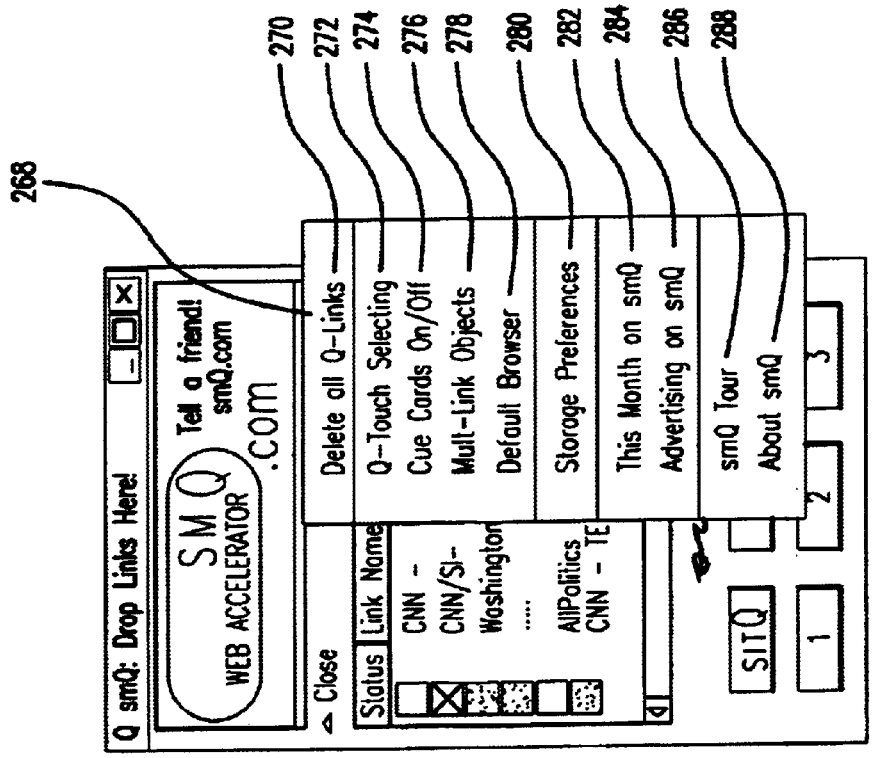
FIG. 21 illustrates the options menu box of the GUI.

If the user right clicks 76 (or equivalent right mouse button process on the user's pointing device) on the border of the maximized or minimized GUI, a menu box 268 is displayed as shown in FIG. 21. The menu can be configured in many forms with the menu items in various positions.

In the preferred embodiment, the first item on the menu 268 is "Delete all Q-Links" 270. When the user left clicks (or equivalent) on this selection, a dialog box confirming the user's desire to delete all the Q-Links in the list of the interface is displayed. If the user confirms this desire, the system invokes the Configuration Manager to delete all Q-Links.

Figure 22:
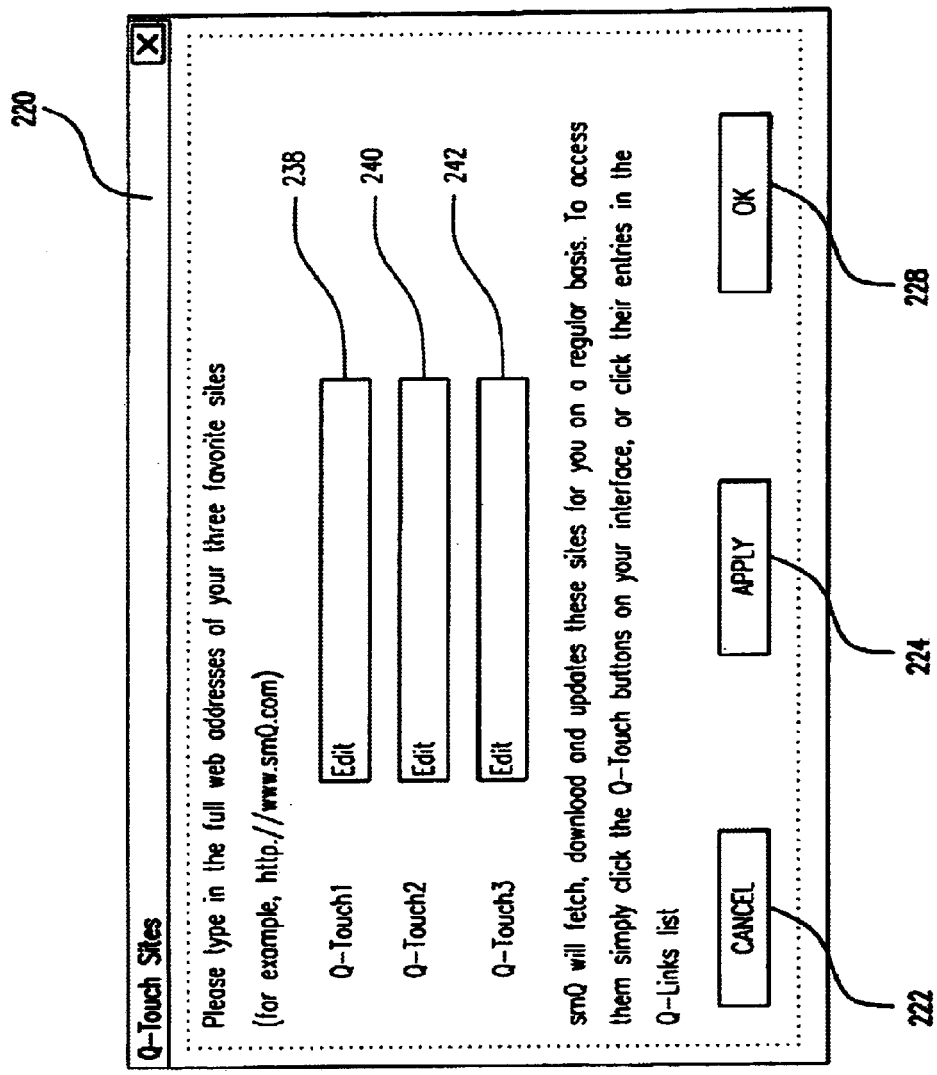
FIG. 22 illustrates the Q-Touch Selection dialog box.

When the user left clicks (or equivalent) on the "Q-Touch Selection" selection 272, a dialog box 220 opens, as shown in FIG. 22. There are three areas where the user can type in the addresses of his/her favorite or frequently accessed Web pages 238, 240 & 242, respectively. When the User presses the "CANCEL" button 222 in the Q-Touch Pages dialog box 220, the box closes without changing the Q-Touch pages address areas 238, 240 & 242. If the user presses the "APPLY" button 224, the invention accepts the new addresses in the Q-Touch page areas 238, 240 & 242, but does not close the dialog box 220. By selecting the "OK" button 228, the invention accepts new addresses in the Q-Touch page areas 238, 240 & 242, and closes the dialog box 220. These areas and addresses are associated with the three numbered buttons on the maximized GUI 251. Button "1" 256 corresponds to the first Q-Touch page area 238. Button "2" 254 corresponds to the second Q-Touch page area 240. Button "3" 252 corresponds to the third Q-Touch page area 242. When the user left clicks (or equivalent) on Button "1" 256, Button "2" 254, or Button "3" 252 in the maximized GUI 251, this displays, in the open instance of the browser 62, the latest version of the Web page associated with the Web address that the user previously input into the Q-Touch page areas 238, 240 or 242, respectively. The invention periodically checks to see if the content on these pages has been updated since the last viewing, and if it has been updated, it will download, in the background according to the BITE hierarchy, the latest versions of these pages for instant viewing from the user's hard disk 36. Notification of a background update is made to the user by presenting the text of the Q-Touch Title and Web Address in red in the list of Q-Links.

When the user left clicks (or equivalent) on the "Cue Cards On/Off" selection 274, a dialog box is displayed confirming the user's desire to turn the invention's cue card system on or off. When turned on, this feature displays information to the user in a small box indicating the functionality of the area beneath the current position of the cursor of the mouse pointer (or equivalent).

When the user left clicks (or equivalent) on the "Multi-Link Objects" selection 276, a dialog box is displayed confirming the user's desire to enable or disable the invention's Multi-Link Option.

When the user left clicks (or equivalent) on the "Default Browser" selection 278, a dialog box is displayed enabling the user to select the browser that he/she wishes to use with the invention to access the Internet. Any changes to these settings will take effect at the beginning of the next session.

When the user left clicks (or equivalent) on the "Storage Preferences" selection 280, a dialog box is displayed enabling the user to change the size of the invention's hard disk cache.

When the user left clicks (or equivalent) on the "This Month on smQ" selection 282, the user is connected, as a primary download, to a Web page displaying a list of the banners of the current month's advertisers on the invention.

When the user left clicks (or equivalent) on the "Advertising on smQ" selection 284, the user is connected, as a primary download, to a Web page displaying information and pricing on advertising on the invention.

When the user left clicks (or equivalent) on the "smQ Tour" selection 286, the user is connected, as a primary download, to a Web page containing a demo on how to use the invention.

When the user left clicks (or equivalent) on the "About smQ" selection 288, the user is connected, as a primary download, to a Web page containing legal information on the use of the invention. This may include license information, copyright notices, trademark notices, product serial numbers, and the like.

The Option Control Manager is responsible for controlling all of these user interactions via either the buttons on the interface or the right-click menu. The functional components of the Option Control Manager are the Menu Control Manager and the Button Control Manager.

The Menu Control Manager is responsible for controlling all choices made by the user from the right click pop up menu on the interface. The Menu Control Manager performs the following functions: 1) Deletes all Q-Links and iInvokes the Q-Links Manager to delete all Q-Links in the interface list; 2) Displays the current Q-Touch pages #1, #2, and #3 to the user. 3) Accepts the Q-Touch pages #1, #2, and #3 from the user. If no entry for Q-Touch #3 is made, it is defaulted to a predetermined URL, such as a URL for smQ; 4) Invokes Configuration Manager to change the Q-Touch page Entries in the INI File and the Preference File; 5) Cue Cards, gets the user entry for the Cue Cards (ON/OFF) and invokes the configuration Manager to change the Cue Card option in the INI File 6) Multi Link Objects, gets the user entry for the Multi Link Option and Invokes the Configuration Manager to change the Multi- Link Option in the INI File; 7) Default Browser (changes take effect in next session), gets the user entry for the default Browser and invokes the configuration Manager to change the Default Browser in the INI File; Storage Preferences, accepts the Storage preference from the user and invokes Configuration Manager to change the Storage Preference in the INI File and the Preference File. If cache size is reduced, Invoke the Q-Links Manager to do auto or manual deletion. 8) This Month on smQ, Invokes the Configuration Manager to get the URL of the "This Month on smQ" link and Shows the URL in the open instance of the browser; 9) Advertising on smQ, invokes the Configuration Manager to get the URL of the "Advertising on smQ" link and shows the URL in the open instance of the browser; 10) smQ Tour, Invokes the Configuration Manager to get the URL of the "smQ Tour" link and shows the URL in the open instance of the browser; 11) About smQ, invokes the Configuration Manager to get the URL of the "About smQ" link and shows the URL in the open instance of the browser.

The Button Control Manager is responsible for controlling all choices made by the user via clicking on the buttons and SMN logo on the Invention Interface 404. The functionalities of the Button Control Manager are displayed in Table 13.

TABLE 13

| Button | Result |
| --- | --- |
| SMN logo | Invokes the Configuration Manager to get the URL of the SMN logo and show the url in the open instance of the browser. |
| smQ logo | Invokes the Configuration Manager to get the URL of the SMN logo and show the URL in the open instance of the browser. |
| Search/Licensee Partner's Button | Invokes the Configuration Manager to get the URL of the Search partner/Licensee partner's Web site and shows the URL in the open instance of the browser. |
| Help Button | Invokes the Configuration Manager to get the URL of the technical support pages and show the URL in the open instance of the browser. |
| Q-Touch Page #1 | Gets the cache local path of the downloaded URL for the Q-Touch Page #1 from the Engine. Displays in the open instance of the browser. If Q-Touch Page #1 is not specified, invokes Configuration Manager to get entry for the Q-Touch Pages, and writes it to Preference File and INI File. |
| Q-Touch Page #2 | Gets the cache local path of the downloaded URL for the Q-Touch Page #2 from the Engine. Displays in the open instance of the browser. If Q-Touch Page #2 is not specified, invokes Configuration Manager to get entry for the Q-Touch Pages, and writes it to Preference File and INI File. |
| Q-Touch Page #3 | Gets the cache local path of the downloaded URL for the Q-Touch Page #3 from the Engine. Displays in the open instance of the browser. |

As technology improves, the applications and features of this invention will be extended to include the following: (1) support for stereo audio and full-motion video (both streamed and downloaded) in the ad banner display area of the Invention Interface 404; (2) compatibility with any future browsers which are manufactured and become popular with users; (3) compatibility with other and any future operating systems which are manufactured and become popular with users; (4) full programming implementation in Java to ensure full cross-platform support; (5) full online updating capabilities so that the most recent version of the product is automatically available to users; (6) ad targeting systems that deliver advertising according to users' real time surfing patterns or habits; (7) screen mapping capabilities to ensure 100% efficacy for D&D of graphics in all browser platforms; (8) fully integrated bookmark support between the browser and the Q-Links list; (9) various options for further customization of the Invention Interface 404, e.g. (a) storing Q-Links in a user-defined manner (i) by alphabet of Q-Link title, ascending/descending; (ii) by date, ascending/descending; (b) auto closure of maximized GUI 251 following selection of Q-Link; and (10) Automatic logging, storage, and uploading of Page-In-View data, wherein the URL of the page on display when an ad is clicked upon is periodically reported back to the Invention Web Server 302.

What is claimed is:

1. A method of enhanced downloading of information from a computer network to a computer operated by a user, the computer alternately downloading information from the computer network and not downloading information from the computer network, thereby causing one or more idle times, the method comprising:

accepting a user selection for additional information to be downloaded at a distinct graphical user interface connected to a web browser;

determining whether a cache is full;

accepting at least one user command at the graphical user interface for managing the cache in response to the cache being full;

downloading at least some of the additional information from the computer network to the computer operated by the user during at least one of the idle times; and caching the downloaded additional information at the computer operated by the user substantially immediately after downloading;

wherein the step of downloading at least some of the additional information from the computer network to the computer operated by the user during at least one of the idle times further comprises:

prioritizing the downloading of conventionally downloaded information and the additional information; wherein the priority of the conventionally downloaded information is higher than the priority of the additional information; wherein the additional information comprises user selections, advertising, and predetermined favorite sources of information, and wherein the priority of user selections is higher than the priority of advertising, which is higher than the priority of predetermined favorite sources of information; wherein downloading of lower priority information is suspended to allow downloading of higher priority information;

wherein the step of accepting at least one user command at the graphical user interface for managing the cache in response to the cache being full further comprises being operable to accept commands to increase a size of the cache and to delete requests to download information from a queue.

2. The method of claim 1 further comprising:

detecting at least one of the one or more idle times; and wherein the downloading step comprises downloading at least some of the additional information from the computer network during the detected at least one idle time.

3. The method of claim 1 wherein the computer network is the Internet.

4. The method of claim 3 wherein the computer network is the World Wide Web.

5. The method of claim 4 further comprising:

providing a web browser at the computer.

6. The method of claim 4 wherein the user selections comprise an address of a web page and the additional information comprises content of a web page.

7. The method of claim 1 further comprising:
connecting the computer to the computer network.

8. The method of claim 7 wherein the connecting step comprises:
utilizing a telephone connection to connect to the computer network.

9. The method of claim 7 further comprising:
displaying the retrieved additional information; and
disconnecting the computer from the computer network.

10. The method of claim 9 wherein the displaying step is completed prior to the disconnecting step.

11. The method of claim 1 further comprising:
maintaining a list related to the additional information.

12. The method of claim 11 wherein the list comprises one or more selected from the group consisting of Uniform Resource Locators, addresses in the computer network, links, and hyperlinks.

13. The method of claim 11 wherein the list comprises one or more predetermined favorite sources of additional information in the computer network.

14. The method of claim 13 further comprising
periodically monitoring the favorite sources of additional information; sensing for
modification of the additional information; and
wherein the downloading step is performed if a modification is sensed.

15. The method of claim 1 further comprising:
accepting one or more alterations to the user selections for additional information to be downloaded.

16. The method of claim 15 further comprising:
downloading at least some of the additional information from the computer network during at least one of the idle times, in response to the step of accepting alterations.

17. The method of claim 1 wherein the information is packetized and the prioritizing and downloading steps are performed on a packet-by-packet basis.

18. The method of claim 1 wherein the user selections for additional information are entered by a dragging and dropping operation.

19. The method of claim 1 further comprising:
running the graphical user interface in conjunction with a web browser.

20. The method of claim 1 further comprising:
determining if the web browser is activated;
launching the graphical user interface, if the web browser is activated and if the graphical user interface is not already active.

21. The method of claim 1 wherein the caching step comprises:
caching the additional information on a hard disk drive.

22. The method of claim 1 wherein the additional information is cached in a cache, the method further comprising:
managing the cache.

23. The method of claim 22 wherein the managing step comprises:
deleting contents of the cache if the cache is within a tolerance level of being full.

24. The method of claim 1 further comprising:
retrieving at least a portion of the cached additional information.

25. The method of claim 24 further comprising:
accepting user input that identifies the additional information to be retrieved.

26. The method of claim 24 further comprising:
displaying the retrieved additional information.

27. The method of claim 1 wherein the additional information comprises an advertisement.

28. The method of claim 27 further comprising:
displaying the advertisement as a banner at the computer.

29. The method of claim 27 wherein the advertisement comprises stereo audio.

30. The method of claim 27 wherein the advertisement comprises full-motion video.

31. The method of claim 1 wherein the downloading step comprises:
downloading the additional information from a server associated with the method of claim 1.

32. The method of claim 1 wherein the downloading step comprises:
displaying the additional information at one or more times selected by the user.

33. The method of claim 1 further comprising:
displaying the information conventionally downloaded, wherein the one or more idle times overlap to some extent with a time during which the information conventionally downloaded is displayed.

34. The method of claim 1 further comprising:
collecting user data.

35. The method of claim 34 wherein the user data comprises a demographic profile.

36. The method of claim 34 wherein the user data comprises characteristics of use of the computer network.

37. The method of claim 34 wherein the user data comprises the user selections.

38. The method of claim 34 further comprising:
targeting advertisements in accordance with the user data.

39. The method of claim 1 wherein the idle time is sandwiched between periods of downloading activity.

40. A method for enhancing downloading of information from a computer network to a computer operated by a user, the computer alternately downloading information from the computer network and not downloading information from the computernetwork, thereby causing one or more idle times, the method comprising:
accepting user selections for additional information to be downloaded at a distinct graphical user interface connected to a browser to display the additional information in the browser;
determining whether a cache is full;
accepting at least one user command at the graphical user interface for managing the cache in response to the cache being full;
downloading at least some of the additional information from the computer network to the computer operated by the user during at least one of the idle times; and
displaying the additional information at one or more times selected by the user;
wherein the step of accepting at least one user command at the graphical user interface for managing the cache in response to the cache being full further comprises being operable to accept at least user commands for deleting requests to download information from a queue and for increasing a size of the cache.

41. The method of claim 40 wherein the user selections are accepted in an order of acceptance, and the additional information is displayed in an order of display that is independent of the order of acceptance.

42. The method of claim 40 wherein the additional information is downloaded in an order of downloading, and the additional information is displayed in an order of display that is independent of the order of downloading.

43. An apparatus for use with a computer connected to a computer network, the computer operated by a user, the computer alternately downloading information from the computer network and not downloading information from the computer network, thereby causing one or more idle times, the apparatus comprising:

an interface, by which user selections for additional information to be downloaded are entered, at least one user command for managing a cache located at the computer is operable to be entered, and user commands for displaying the additional information are entered, wherein the interface is a distinct graphical user interface connected to a browser;

at least one transfer client, connected to the interface, by which at least some of the additional information is requested from the computer network during at least one of the idle times;

wherein the at least one transfer client is operable to prioritize a downloading of conventionally downloaded information and the additional information, the priority of the conventionally downloaded information being higher than the priority of the additional information; wherein the additional information comprises user selections, advertising, and predetermined favorite sources of information, and wherein the priority of user selections is higher than the priority of advertising, which is higher than the priority of predetermined favorite sources of information; and a cache, located at the computer operated by the user and connected to the transfer client, where the requested additional information is stored for later retrieval substantially immediately after being received from the computer network;

wherein the at least one user command operable to be entered comprises a command for deleting requests to download information from a queue and a command for increasing a size of the cache.

44. The apparatus of claim 43 wherein at least some of the user selections are entered by a dragging and dropping operation.

45. The apparatus of claim 43 wherein the transfer client is an HTTP compliant client.

46. The apparatus of claim 43 wherein the transfer client is a background Internet transfer agent.

47. The apparatus of claim 43 further comprising:

a queue manager, connected to the interface and the transfer client, by which the user selections are queued.

48. The apparatus of claim 43 further comprising:

a cache manager connected to the cache.

49. The apparatus of claim 43 further comprising:

a gateway connected to the transfer agent and the computer network.

50. The apparatus of claim 43 wherein the at least one transfer client are several transfer clients, each transfer client generating transfer requests of a given priority, the apparatus further comprising:

a priority resolver, connected to the several transfer clients, by which the transfer requests are processed in accordance with the priorities.

51. The apparatus of claim 43 wherein:

the browser alternately conventionally downloading information from the computer network and not conventionally downloading information from the computer network, thereby causing the one or more idle times.

52. The apparatus of claim 43 wherein at least one transfer client comprises a thread by which advertisements are transferred from the computer network.

53. The apparatus of claim 43 further comprising:

a display manager, connected to the interface and the cache, wherein the display manager controls displaying of cached advertisement in the interface.

54. The apparatus of claim 53 further comprising:

a timer, connected to the display manager, wherein the timer periodically prompts the display manager to display an advertisement in the interface.

55. The apparatus of claim 43 further comprising:

a timer, connected to the thread, wherein the timer periodically prompts the thread to transfer advertisements from the computer network.

56. The apparatus of claim 43 wherein the cache contents comprises at least one default advertisement.

57. An apparatus for use with a computer connected to a computer network, the computer operated by a user, the apparatus comprising:

a browser by which the user alternately downloads information from the computer network and not downloads information from the computer network, thereby causing one or more idle times;

a distinct graphical user interface connected to the browser, by which user selections for additional information to be downloaded are entered, user commands for displaying the additional information are entered, and at least one user command for managing a cache is entered, the cache being operable to store the additional information for later retrieval; wherein the graphical user interface is connected to the browser to display the additional information in the browser; and at least one transfer client, connected to the interface and the cache, by which at least some of the additional information is requested from the computer network during at least one of the idle times for downloading and storage in the cache;

wherein the at least one user command for managing a cache comprises deleting requests to download information from a queue and increasing a size of the cache.

58. The apparatus of claim 57, wherein requests are deleted by date, such that earliest request in the queue are automatically deleted first, in response to the at least one command being entered.

59. The apparatus of claim 57, wherein the at least one command comprises at least one user selection of a request in the queue for deletion.

* * * * *

UNITED STATES PATENT AND TRADEMARK OFFICE
CERTIFICATE OF CORRECTION

PATENT NO. : 6,769,019 B2  Page 1 of 1
DATED : July 27, 2004
INVENTOR(S) : Ferguson It is certified that error appears in the above-identified patent and that said Letters Patent is hereby corrected as shown below:

<u>Title page,</u>
Item [57], ABSTRACT,
Lines 4 and 11, change "addictional" to -- additional --; and
Line 10, change "provide" to -- provided --.

Signed and Sealed this

Twenty-fifth Day of April, 2006

JON W. DUDAS
*Director of the United States Patent and Trademark Office*